US012624468B2

(12) United States Patent
Khan et al.

(10) Patent No.: US 12,624,468 B2
(45) Date of Patent: May 12, 2026

(54) LARGE SCALE, MONODISPERSED OCTAHEDRAL BiVO4 MICROCRYSTALS, PHOTOSTABILITY AND WATER OXIDATION THEREOF

(71) Applicant: KING FAHD UNIVERSITY OF PETROLEUM AND MINERALS, Dhahran (SA)

(72) Inventors: Abuzar Khan, Dhahran (SA); Ibrahim Khan, Dhahran (SA); Mohd Yusuf Khan, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 1240 days.

(21) Appl. No.: 17/506,271

(22) Filed: Oct. 20, 2021

(65) Prior Publication Data

US 2023/0124162 A1 Apr. 20, 2023

(51) Int. Cl.
| | |
|---|---|
| C25B 11/087 | (2021.01) |
| C01G 31/00 | (2006.01) |
| C25B 1/04 | (2021.01) |
| C25B 1/55 | (2021.01) |
| C25B 11/052 | (2021.01) |
| C25B 11/067 | (2021.01) |
| C25B 11/077 | (2021.01) |

(52) U.S. Cl.
CPC .......... *C25B 11/087* (2021.01); *C01G 31/006* (2013.01); *C25B 1/04* (2013.01); *C25B 1/55* (2021.01); *C25B 11/052* (2021.01); *C25B 11/067* (2021.01); *C25B 11/077* (2021.01);

*C01P 2002/72* (2013.01); *C01P 2002/76* (2013.01); *C01P 2002/82* (2013.01); *C01P 2004/03* (2013.01); *C01P 2004/04* (2013.01); *C01P 2004/61* (2013.01); *C01P 2004/62* (2013.01); *C01P 2006/40* (2013.01)

(58) Field of Classification Search
CPC . C01G 31/006; C01P 2004/61; C01P 2004/62
See application file for complete search history.

(56) References Cited

U.S. PATENT DOCUMENTS 9,856,567 B2 1/2018 Choi et al.

FOREIGN PATENT DOCUMENTS

| CN | 102626616 A | 8/2012 |
|---|---|---|
| CN | 103112896 B | 12/2014 |

(Continued)

OTHER PUBLICATIONS

CN-109133168-A machine translation (Year: 2019).*

(Continued)

*Primary Examiner* — Michael Forrest
*Assistant Examiner* — Nicole Lee Quist
(74) *Attorney, Agent, or Firm* — Oblon, McClelland, Maier & Neustadt, L.L.P.

(57) ABSTRACT

A method of preparing bismuth vanadate particles is described. The bismuth vanadate particles prepared via ultrasonication and hydrothermal treatment exhibit controlled morphology (e.g., octahedral shape) and crystallinity (e.g., tetragonal crystal symmetry). A photoelectrode containing bismuth vanadate particles and a method of using the photoelectrode in a photoelectrochemical cell for water splitting is also provided.

11 Claims, 14 Drawing Sheets

(56)                References Cited

FOREIGN PATENT DOCUMENTS

| CN | 109133168 A | * | 1/2019 | ............ C01G 31/00 |
| CN | 109518213 A | | 3/2019 | |
| CN | 109622062 A | | 4/2019 | |
| CN | 107478698 B | | 8/2019 | |

OTHER PUBLICATIONS

Wei, S.S et al "Effect of alkali concentration of precursor solution on microwave-hydrothermal synthesis and photocatlytic properties of BiVO4 powder", Gongeng Cailiao,2012, 43, 6, 756-759 (Year: 2012).*

Mandi Han, et al., "Synthesis of mono-dispersed $m$-BiVO$_4$ octahedral nano-crystals with enhanced visible light photocatalytic properties", CRYSTENGCOMM, vol. 13, Issue 22, Sep. 7, 2011, pp. 6674-6679 (Abstract only).

Min-Woo Kim, et al., "Tuning the morphology of electrosprayed BiVO$_4$ from nanopillars to nanoferns via pH control for solar water splitting", Journal of Alloys and Compounds, vol. 769, Nov. 15, 2018, pp. 193-200 (Abstract only).

Wenjun Luo, et al., "Synthesis, growth mechanism and photoelectrochemical properties of BiVO$_4$ microcrystal electrodes", Journal of Physics D: Applied Physics, IOP Publishing, vol. 43, No. 40, Sep. 20, 2010, 2 pages (Abstract only).

J M Riega, et al., "Photocatalytic activity of BiVO$_4$ and ZnO—CuO nanoparticles under solar irradiation", Journal of Physics: Conference Series, IOP Publishing, Peruvian Workshop on Solar Energy, vol. 1173, No. 012010, 2019, pp. 1-4.

Tao Yang, et al., "Self-assembly of highly crystalline spherical BiVO$_4$ in aqueous solutions", Journal of Crystal Growth, vol. 311, Issue 20, Oct. 1, 2009, pp. 4505-4509 (Abstract only).

Yafang Zhang, et al., "Monoclinic BiVO$_4$ micro-/nanostructures: Microwave and ultrasonic wave combined synthesis and their visible-light photocatalytic activities", Journal of Alloys and Compounds, vol. 551, Feb. 25, 2013, pp. 544-550 (Abstract only).

* cited by examiner

LARGE SCALE, MONODISPERSED OCTAHEDRAL BiVO4 MICROCRYSTALS, PHOTOSTABILITY AND WATER OXIDATION THEREOF

BACKGROUND OF THE INVENTION

Technical Field

The present disclosure relates to a method of making bismuth vanadate particles, and a method of using bismuth vanadate particles as part of a photoelectrode for water splitting.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Facet-controlling has become an attractive method to enhance the catalytic behavior of semiconducting photocatalysts through modification of their morphology and crystallinity. Photochemical processes including light absorption and charge separation could be improved using photocatalysts having a specifically designed morphology and surface atomic structures [Y. Zhao, R. Li, L. Mu, C. Li, Significance of Crystal Morphology Controlling in Semiconductor-Based Photocatalysis: A Case Study on BiVO$_4$ Photocatalyst, Cryst. Growth Des. 17 (2017) 2923-2928, incorporated herein by reference in its entirety]. For instance, morphological and facet tuning of anatase TiO$_2$ {001} facets created highly photoactive species. Because of the large surface area of {001} facets, the exposed facets of anatase TiO$_2$ grown as a single crystal generated an efficient photoresponse. Controlling the morphology and crystallinity of Platonian-shaped (tetrahedra, hexahedra, octahedra, etc.) metal oxides and metal vanadates is a challenge to research efforts because less is known about their crystallization than non-Platonian shaped metal oxides [X. Wang, D. Liao, H. Yu, J. Yu, Highly efficient BiVO$_4$ single-crystal photocatalyst with selective Ag$_2$O—Ag modification: Orientation transport, rapid interfacial transfer and catalytic reaction, Dalt. Trans. 47 (2018) 6370-6377, incorporated herein by reference in its entirety].

Metal vanadates are an emerging class of photocatalytic materials for photoelectrochemical applications. Among metal vanadates, BiVO$_4$ (BV) has attracted attention for satisfactory optoelectrical characteristics (e.g., a bandgap of ~2.40 eV), along with ionic conductivity, ferroelasticity, acousto-optical, and photochromic properties. Further, BV possesses high chemical stability and low toxicity [K. Wenderich, G. Mul, Methods, Mechanism, and Applications of Photodeposition in Photocatalysis: A Review, Chem. Rev. 116 (2016) 14587-14619; S. Wang, G. Liu, L. Wang, Crystal Facet Engineering of Photoelectrodes for Photoelectrochemical Water Splitting, Chem. Rev. 119 (2019) 5192-5247; and J. K. Cooper, S. Gul, F. M. Toma, L. Chen, Y. S. Liu, J. Guo, J. W. Ager, J. Yano, I. D. Sharp, Indirect bandgap and optical properties of monoclinic bismuth vanadate, J. Phys. Chem. C. 119 (2015) 2969-2974, each incorporated herein by reference in their entirety]. Under visible light irradiation, BV materials can be used in photoelectrochemical (PEC) applications as photoanodes. Because of its suitable band positions, chemical stability, sensitivity to visible light, and low cost, BV may be an alternative photocatalyst to TiO$_2$ for solar energy conversion and environmental protection applications [G.-L. Li, First-principles investigation of the surface properties of fergusonite-type monoclinic BiVO$_4$ photocatalyst, RSC Adv. 7 (2017) 9130-9140; and H. Gong, N. Freudenberg, M. Nie, R. Van De Krol, K. Ellmer, BiVO$_4$ photoanodes for water splitting with high injection efficiency, deposited by reactive magnetron co-sputtering, AIP Adv. 6 (2016), each incorporated herein by reference in their entirety].

In view of the forgoing, one objective of the present disclosure is to provide a method of preparing bismuth vanadate particles. The bismuth vanadate particles may be present on a conducting substrate to form a photoelectrode used, for example, in a photoelectrochemical cell for water splitting.

BRIEF SUMMARY OF THE INVENTION

According to a first aspect, the present disclosure relates to a method of preparing bismuth vanadate particles that have an octahedral shape and comprise crystalline BiVO$_4$ having a tetragonal crystal symmetry. The method involves the steps of (i) mixing a bismuth(III) salt and an acidic aqueous solution to form a bismuth mixture, (ii) mixing a metavanadate salt and a basic aqueous solution to form a vanadate mixture, (iii) mixing the vanadate mixture and the bismuth mixture to form a reaction mixture that is simultaneously subjected to ultrasonication, and (iv) hydrothermally treating the reaction mixture, thereby forming the bismuth vanadate particles.

In one embodiment, the bismuth vanadate particles have an average particle size in a range of 0.8-6 µm.

In one embodiment, the reaction mixture is subjected to ultrasonication at a frequency in a range of 17.5-22.5 kHz.

In one embodiment, the reaction mixture is subjected to ultrasonication at an amplitude in a range of 8-35%.

In a further embodiment, the reaction mixture is subjected to ultrasonication at an amplitude in a range of 18-22%, and the bismuth vanadate particles consist essentially of crystalline BiVO$_4$ having a tetragonal crystal symmetry.

In one embodiment, the reaction mixture is hydrothermally treated at a temperature of 100-250° C.

In one embodiment, the bismuth(III) salt is bismuth(III) nitrate.

In one embodiment, the metavanadate salt is ammonium metavanadate.

In one embodiment, the acidic aqueous solution comprises nitric acid, and the basic aqueous solution comprises sodium hydroxide.

In one embodiment, the bismuth mixture further comprises an ionic surfactant.

In a further embodiment, the ionic surfactant is sodium dodecylbenzene sulfonate.

According to a second aspect, the present disclosure relates to a BiVO$_4$ photoelectrode, which includes (i) a conducting substrate, and (ii) bismuth vanadate particles having an octahedral shape and comprising crystalline BiVO$_4$ having a tetragonal crystal symmetry, present on a surface of the conducting substrate.

In one embodiment, the bismuth vanadate particles have an average particle size in a range of 0.8-6 µm.

In one embodiment, the conducting substrate is fluorine-doped tin oxide.

According to a third aspect, the present disclosure relates to a photoelectrochemical cell including the BiVO$_4$ photoelectrode of the second aspect, a counter electrode, and an electrolyte solution containing water and an inorganic salt in contact with both the $BiVO_4$ photoelectrode and the counter electrode.

In one embodiment, the electrolyte solution has an inorganic salt concentration of 0.05-1 M.

In one embodiment, the photoelectrochemical cell further includes a reference electrode.

In one embodiment, the $BiVO_4$ photoelectrode has a photo-current density in a range of 0.15-1.2 mA/cm$^2$ when the photoelectrochemical cell is subjected to a bias potential of 0.5-1.3 V vs RHE under visible light irradiation.

In one embodiment, the $BiVO_4$ photoelectrode has a photo-to-current conversion efficiency (IPCE) in a range of 2-25% when the photoelectrochemical cell is subjected to a bias potential of 1.23 V vs RHE under visible light irradiation, and an applied bias photo-to-current efficiency (ABPE) in a range of 0.02-0.3% when the photoelectrochemical cell is subjected to a bias potential of 0.7-0.85 V vs RHE under visible light irradiation.

According to a fourth aspect, the present disclosure relates to a method of splitting water into $H_2$ and $O_2$. The method involves subjecting the photoelectrochemical cell of the third aspect to a bias potential of 0.5-2.0 V, and concurrently irradiating the photoelectrochemical cell with visible light, thereby forming $H_2$ and $O_2$.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
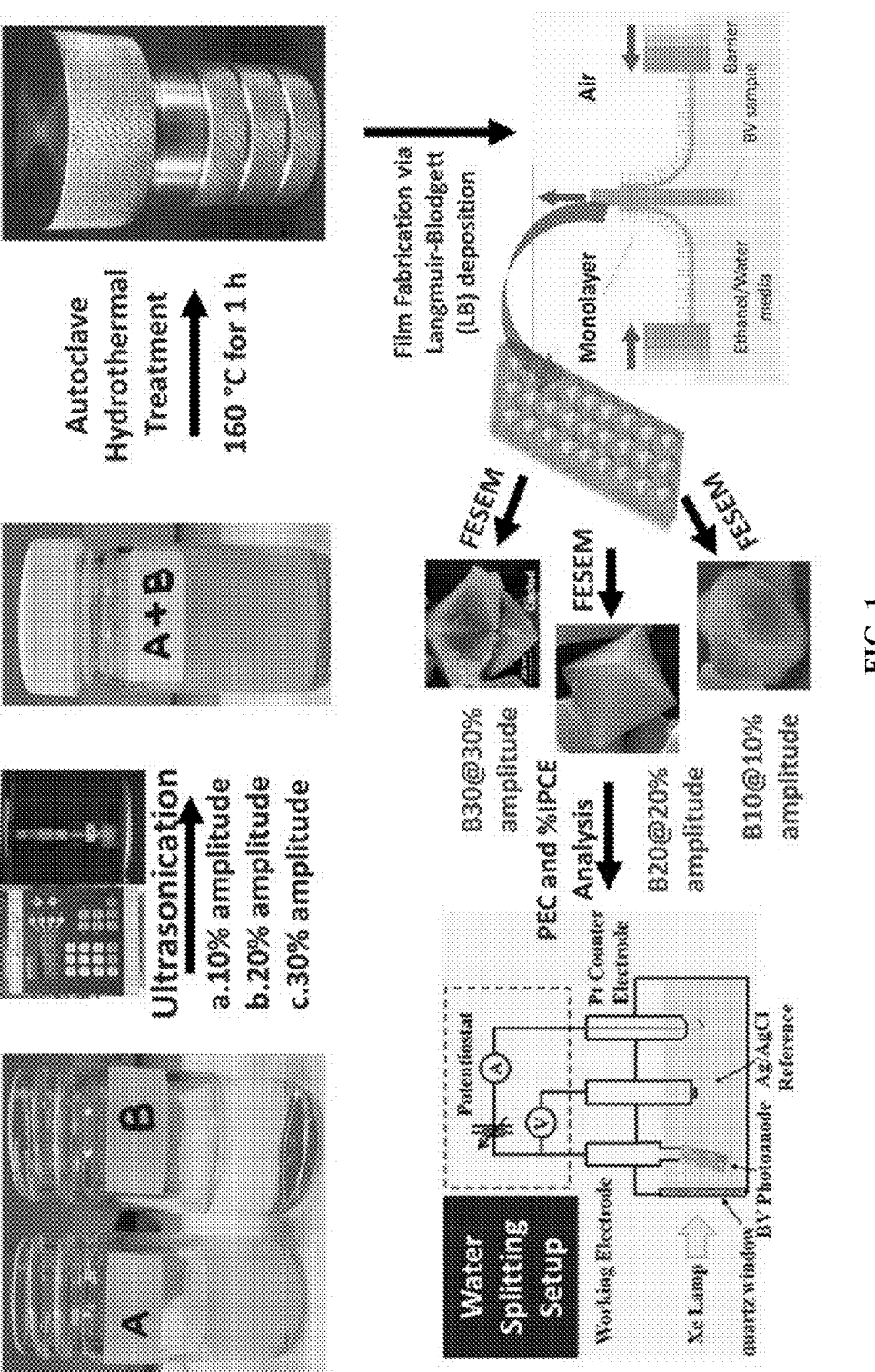
FIG. 1 illustrates the synthesis of bismuth vanadate particles via ultrasonication and hydrothermal treatment, the fabrication of $BiVO_4$ photoelectrode, and a water splitting setup containing $BiVO_4$ photoelectrode.

Embodiments of the present disclosure will now be described more fully hereinafter with reference to the accompanying drawings, in which some, but not all embodiments of the disclosure are shown.

The present disclosure may be better understood with reference to the following definitions. As used herein, the words "a" and "an" and the like carry the meaning of "one or more." Within the description of this disclosure, where a numerical limit or range is stated, the endpoints are included unless stated otherwise. Also, all values and subranges within a numerical limit or range are specifically included as if explicitly written out.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Although the open-ended term "comprising," as a synonym of terms such as including, containing, or having, is use herein to describe and claim the present composition and methods, the composition and/or methods may alternatively be described using more limiting terms, such as "consisting of" or "consisting essentially of" the recited components/steps. For example, a composition which consists essentially of the recited components may contain other components which do not adversely affect the photoelectrochemical properties of the composition.

As used herein, the words "about" or "substantially similar" may be used when describing magnitude and/or position to indicate that the value and/or position described is within a reasonable range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), or +/−15% of the stated value (or range of values).

The present disclosure includes all hydration states of a given salt or formula, unless otherwise noted. For example, bismuth(III) nitrate includes anhydrous $Bi(NO_3)_3$, pentahydrate $Bi(NO_3) \cdot 5H_2O$, and any other hydrated forms or mixtures.

The present disclosure further includes all isotopes of atoms occurring in the present compounds. Isotopes include those atoms having the same atomic number but different mass numbers. By way of general example, and without limitation, isotopes of hydrogen include deuterium and tritium, and isotopes of oxygen include $^{16}O$, $^{17}O$ and $^{18}O$. Isotopically labeled compounds of the disclosure can generally be prepared by conventional techniques known to those skilled in the art or by processes and methods analogous to those described herein, using an appropriate isotopically labeled reagent in place of the non-labeled reagent otherwise employed.

Recently, BV materials have been studied for photoelectrochemical (PEC) water splitting applications [I. Khan, S. Ali, M. Mansha, A. Qurashi, Sonochemical assisted hydrothermal synthesis of pseudo-flower shaped Bismuth vanadate ($BiVO_4$) and their solar-driven water splitting application, Ultrason. Sonochem. 36 (2017) 386-392; N. Iqbal, I. Khan, Z. H. A. Yamani, A. Qurashi, A facile one-step strategy for in-situ fabrication of $WO_3$—$BiVO_4$ nanoarrays for solar-driven photoelectrochemical water splitting applications, Sol. Energy. 144 (2017) 604-611; S. Ali, I. Khan, S. A. Khan, M. Sohail, Z. H. Yamani, M. A. Morsy, M. Qamaruddin, Plasmon aided ($BiVO_4$)$_x$—($TiO_2$)$_{1-x}$, ternary nanocomposites for efficient solar water splitting, Sol. Energy. 155 (2017) 770-780; A. A. M. Ibrahim, I. Khan, N. Iqbal, A. Qurashi, Facile synthesis of tungsten oxide—Bismuth vanadate nanoflakes as photoanode material for solar water splitting, Int. J. Hydrogen Energy. 42 (2017) 3423-3430; and I. Khan, A. Qurashi, Shape Controlled Synthesis of Copper Vanadate Platelet Nanostructures, Their Optical Band Edges, and Solar-Driven Water Splitting Properties, Sci. Rep. 7 (2017) 14370, each incorporated herein by reference in their entirety]. Pseudo flower shaped BV microparticles having a current density of 0.7 $mAcm^{-2}$ were synthesized using ultrasonication approach assisted by hydrothermal treatment. The BV microparticles were obtained with good yield within a short reaction time using this approach because ultrasonication could improve separation of the BV microparticles. In addition, it was found that temperature played a role in controlling the morphology and overall PEC performance of the resulting BV microparticles [I. Khan, S. Ali, M. Mansha, A. Qurashi, Sonochemical assisted hydrothermal synthesis of pseudo-flower shaped Bismuth vanadate ($BiVO_4$) and their solar-driven water splitting application, Ultrason. Sonochem. 36 (2017) 386-392, incorporated herein by reference in its entirety].

According to a first aspect, the present disclosure relates to a method of preparing bismuth vanadate particles. The method involves the steps of (i) mixing a bismuth(III) salt and an acidic aqueous solution to form a bismuth mixture, (ii) mixing a metavanadate salt and an basic aqueous solution to form a vanadate mixture, (iii) mixing the vanadate mixture and the bismuth mixture to form a reaction mixture that is simultaneously subjected to ultrasonication, and (iv) hydrothermally treating the reaction mixture, thereby forming the bismuth vanadate particles.

A particle is defined as a small object that behaves as a whole unit with respect to its transport and properties. An average particle size (e.g., average diameter) of the particle, as used herein, and unless otherwise specifically noted, refers to the average linear distance measured from one point on the particle through the center of the particle to a point directly across from it. For polygonal shapes, the term "particle size", as used herein, and unless otherwise specified, refers to the greatest possible distance measured from a vertex of a polygon through the center of the face to the vertex on the opposite side. For a circle, an oval, an ellipse, and a multilobe, "particle size" refers to the greatest possible distance measured from one point on the shape through the center of the shape to a point directly across from it.

Morphologically, $BiVO_4$ (BV) exists in four different polymorphs, including pucherite, clinobisvanite, dreyerite, and scheelite-type tetragonal phases [R. L. Frost, D. A. Henry, M. L. Weier, W. Martens, Raman spectroscopy of three polymorphs of BiVO4: clinobisvanite, dreyerite and pucherite, with comparisons to $(VO_4)_3$-bearing minerals: namibite, pottsite and schumacherite, J. Raman Spectrosc. 37 (2006) 722-732; and S. Tokunaga, H. Kato, A. Kudo, Selective preparation of monoclinic and tetragonal $BiVO_4$ with scheelite structure and their photocatalytic properties, Chem. Mater. 13 (2001) 4624-4628, each incorporated herein by reference in their entirety]. Among these, the tetragonal phase is considered highly photoactive and has been explored as a photocatalytic material [I. Khan, S. Ali, M. Mansha, A. Qurashi, Sonochemical assisted hydrothermal synthesis of pseudo-flower shaped Bismuth vanadate ($BiVO_4$) and their solar-driven water splitting application, Ultrason. Sonochem. 36 (2017) 386-392, incorporated herein by reference in its entirety]. The morphology of $BiVO_4$ may have a strong impact on the photocatalytic activity. Research efforts are needed to synthesize $BiVO_4$ with controlled morphologies and faceted crystallinities in order to further enhance the PEC performance. Synthetic protocols with proper reaction parameters can lead to an effective morphology design. By controlling various reaction parameters, various synthetic techniques have been used to design specific morphologies (e.g., $BiVO_4$ nanowires [S. Kim, Y. Yu, S. Y. Jeong, M. G. Lee, H. W. Jeong, Y. M. Kwon, J. M. Baik, H. Park, H. W. Jang, S. Lee, Plasmonic gold nanoparticle-decorated $BiVO_4$/ZnO nanowire heterostructure photoanodes for efficient water oxidation, Catal. Sci. Technol. 8 (2018) 3759-3766; J. Resasco, H.

Zhang, N. Kornienko, N. Becknell, H. Lee, J. Guo, A. L. Briseno, P. Yang, $TiO_2/BiVO_4$ nanowire heterostructure photoanodes based on type II band alignment, ACS Cent. Sci. 2 (2016) 80-88; and N. Iqbal, I. Khan, Z. H. A. Yamani, A. Qurashi, A facile one-step strategy for in-situ fabrication of $WO_3$—$BiVO_4$ nanoarrays for solar-driven photoelectro-chemical water splitting applications, Sol. Energy. 144 (2017) 604-611, each incorporated herein by reference in their entirety], $BiVO_4$ nanocones [Y. Qiu, W. Liu, W. Chen, G. Zhou, P. C. Hsu, R. Zhang, Z. Liang, S. Fan, Y. Zhang, Y. Cui, Efficient solar-driven water splitting by nanocone $BiVO_4$-perovskite tandem cells, Sci. Adv. 2 (2016), incor-porated herein by reference in its entirety], spherical $BiVO_4$ [D. Channei, A. Nakaruk, W. Khanitchaidecha, P. Jannoey, S. Phanichphant, Hybrid high-porosity rice straw infused with $BiVO_4$ nanoparticles for efficient 2-chlorophenol deg-radation, Int. J. Appl. Ceram. Technol. 16 (2019) 1060-1068, incorporated herein by reference in its entirety], and flower-shaped $BiVO_4$ [K. Zhang, J. Deng, Y. Liu, S. Xie, H. Dai, Photocatalytic Removal of Organics over $BiVO_4$—Based Photocatalysts, in: Semicond. Photocatal. —Mater. Mech. Appl., InTech, 2016; H. Cai, L. Cheng, F. Xu, H. Wang, W. Xu, F. Li, Fabrication of the heterojunction catalyst $BiVO_4$/P25 and its visible-light photocatalytic activities, R. Soc. Open Sci. 5 (2018); and S. Dong, J. Feng, Y. Li, L. Hu, M. Liu, Y. Wang, Y. Pi, J. Sun, J. Sun, Shape-controlled syn-thesis of $BiVO_4$ hierarchical structures with unique natural-sunlight-driven photocatalytic activity, Appl. Catal. B Envi-ron. 152-153 (2014) 413-424, each incorporated herein by reference in their entirety).

The bismuth vanadate particles of the present disclosure may be in the form of particles of the same shape or different shapes, and of the same size or different sizes. The bismuth vanadate particles may have a polyhedron shape, such as a rectangular shape, a prismatic shape (e.g., a hexagonal prism, a triangular prism), and a pyramidal shape (e.g., a triangular-based pyramid, a square-based pyramid), and other polyhedron shapes. Alternatively, the bismuth vana-date particles have a combination of planar sides with rounded edges or corners.

A regular polyhedron, also termed "Platonic solid", is defined herein as a polyhedron composed of regular poly-gons having equal face angles and equal edge lengths, where the regular polygons meeting identically at every vertex. As used herein, a regular octahedron is a Platonic polyhedron composed of eight equilateral triangles with four of which meeting at every vertex. A non-regular polyhedron (e.g., non-regular octahedron) is defined herein as a polyhedron composed of non-regular polygonal faces. Non-regular polygons have at least two different face angles, and may have equal or unequal edges. In some embodiments, the bismuth vanadate particles have a Platonic shape, such as regular tetrahedral, cubic, hexagonal, octahedral, dodecahe-dron, and icosahedron shapes. In preferred embodiments, the bismuth vanadate particles have an octahedral shape, more preferably a regular octahedral shape. Alternatively, the bismuth vanadate particles may have a non-regular octahedral shape.

Surface roughness is a component of surface texture. It is quantified by the deviations in the direction of the normal vector of a real surface from its ideal form. If these devia-tions are large, the surface is rough; if they are small, the surface is smooth. In one embodiment, the bismuth vanadate particles of the present disclosure are in the form of regular or non-regular octahedrons having a microscopically smooth surface (see FIG. 3C-D). Alternatively, the bismuth vanadate particles may have an uneven/rough surface (see FIGS. 3A-B, 3E-F). The uneven surface may have an irregular contour that is cracked, bumpy, jagged, spiky, serrated, or zigzag.

The bismuth vanadate particles of the present disclosure may comprise $BiVO_4$ in the form of an amorphous phase, a crystalline phase, or both. Preferably, the bismuth vanadate particles comprise or consist essentially of crystalline $BiVO_4$. The amount of crystalline $BiVO_4$ may be measured by X-ray diffraction patterns. In one embodiment, the bis-muth vanadate particles consist essentially of crystalline $BiVO_4$, meaning that the bismuth vanadate particles com-prise at least 99 wt %, preferably 99.9 wt %, more preferably 99.95 wt % $BiVO_4$ in a crystalline state, relative to a total weight of the particles.

The bismuth vanadate particles may comprise crystalline $BiVO_4$ having monoclinic (clinobisvanite $BiVO_4$, scheelite $BiVO_4$) crystal symmetry, tetragonal (dreyerite $BiVO_4$) crystal symmetry, orthorhombic (pucherite $BiVO_4$) crystal symmetry, or a mixture thereof. Preferably, the bismuth vanadate particles comprise or consist essentially of crys-talline $BiVO_4$ of tetragonal crystal symmetry. In one embodiment, the bismuth vanadate particles consist essen-tially of crystalline $BiVO_4$ having tetragonal crystal sym-metry, meaning that the bismuth vanadate particles comprise at least 90 wt %, preferably 95 wt %, more preferably at least 99 wt % crystalline $BiVO_4$ relative to a total weight of the bismuth vanadate particles, and this crystalline $BiVO_4$ has tetragonal crystal symmetry. In some embodiments, where the bismuth vanadate particles comprise less than 100 wt % crystalline $BiVO_4$ having a tetragonal crystal symmetry relative to a total weight of the bismuth vanadate particles, the $BiVO_4$ that is not crystalline $BiVO_4$ having a tetragonal crystal symmetry may be amorphous $BiVO_4$, or $BiVO_4$ having a different crystal symmetry (e.g., monoclinic, ortho-rhombic).

In one or more embodiments, the bismuth vanadate par-ticles of the present disclosure have an average particle size in a range of 0.8-6 μm, preferably 1-5.5 μm, preferably 1.5-5 μm, preferably 2-4.5 μm, preferably 2.5-4 μm, preferably 3-3.5 μm. However, in certain embodiments, the average particle size of the bismuth vanadate particles is less than 0.8 μm or greater than 6 μm.

The bismuth vanadate particles may be agglomerated or non-agglomerated (i.e., the bismuth vanadate particles are well separated from one another and do not form clusters). As used herein, the term "agglomerates" refers to a clustered particulate composition comprising primary particles, the primary particles being aggregated together in such a way so as to form clusters thereof, at least 50 volume percent of the clusters having a mean diameter that is at least 2 times the mean diameter of the primary particles, and preferably at least 90 volume percent of the clusters having a mean diameter that is at least 5 times the mean diameter of the primary particles. The primary particles may be the bismuth vanadate particles having an average particle size as those previously described. In one embodiment, the bismuth vana-date particles are agglomerated and the agglomerates have an average diameter in a range of 2-50 μm, 4-25 μm, or 8-10 μm. Preferably, the bismuth vanadate particles of the present disclosure are non-agglomerated.

Dispersity is a measure of the heterogeneity of sizes of molecules or particles in a mixture. In probability theory and statistics, the coefficient of variation (CV), also known as relative standard deviation (RSD) is a standardized measure of dispersion of a probability distribution. It is expressed as a percentage and is defined as the ratio of the standard deviation ($\sigma$) of to the mean ($\mu$, or its absolute value $|\mu|$). The CV or RSD is widely used to express precision and repeatability. It shows the extent of variability in relation to the mean of a population. The bismuth vanadate particles having a narrow size dispersion, i.e., monodispersity, is preferred. As used herein, "monodisperse", "monodispersed" and/or "monodispersity" refers to particles having a CV or RSD of less than 25%, preferably less than 20%, preferably less than 10%, preferably less than 8%, preferably less than 6%, preferably less than 5%. The bismuth vanadate particles may be monodisperse with a coefficient of variation or relative standard deviation (ratio of the particle size standard deviation to the particle size mean) of less than 25%, less than 20%, less than 15%, less than 12%, less than 10%, less than 9%, less than 8%, less than 7%, less than 6%, less than 5%, or preferably less than 2%.

The method of preparing the bismuth vanadate particles involves mixing a bismuth salt and an acidic aqueous solution to form a bismuth mixture. In preferred embodiments, the bismuth salt is a bismuth(III) salt. Exemplary bismuth salts include, but are not limited to, bismuth(III) nitrate, bismuth(III) nitrate pentahydrate, bismuth(III) sulfate, bismuth(III) acetate, bismuth(III) chloride, bismuth(III) bromide, bismuth(III) iodide, bismuth(III) phosphate, bismuth hydroxide, bismuth(III) citrate, bismuth(III) oxynitrate, bismuth(III) oxychloride, and the like. In one embodiment, more than one type of bismuth(III) salt may be used. Preferably, the bismuth(III) salt is bismuth(III) nitrate, bismuth(III) nitrate pentahydrate, or a mixture thereof. The bismuth salt may be present in an amount of 10-5,000 mM, preferably 25-2,500 mM, preferably 50-1,000 mM, preferably 75-500 mM, preferably 100-250 mM relative to a total volume of the bismuth mixture.

The acidic aqueous solution comprises an acid. The acid employed herein may be an inorganic acid or an organic acid, and specifically includes, but is not limited to, nitric acid, hydrochloric acid, sulfuric acid, phosphoric acid, sulfamic acid, fluoroboric acid, hexafluorophosphoric acid acetic acid, fluoroacetic acid, chloroacetic acid, dichloroacetic acid, trifluoroacetic acid, trichloroacetic acid, propionic acid, formic acid, citric acid, citrate acid, oxalate acid, and benzoic acid. Preferably, the acid is nitric acid. In one embodiment, the acid employed herein has a molarity of 0.5-8 M, preferably 1-6 M, more preferably 2-5 M, or about 4 M. In a further embodiment, the pH of the bismuth mixture may be in a range of from about 0 to 5, from about 0.1 to 4, from about 0.4 to 3, from about 0.6 to 2, or from about 0.8 to 1. Most preferably, the pH of the bismuth mixture is about 0.

The bismuth mixture may further comprise an ionic surfactant, preferably an anionic surfactant. Exemplary anionic surfactants include, but are not limited to, alkylbenzene sulfonates (e.g., sodium dodecylbenzene sulfonate (SDBS), sodium octylbenzene sulfonate, sodium propylbenzene sulfonate), alkyl sulfonates (e.g., sodium octane sulfonate, sodium decane sulfonate, sodium dodecane sulfonate), and alkyl sulfate (e.g., sodium lauryl sulfate (sodium dodecyl sulfate), lithium dodecyl sulfate, sodium octyl sulfate). In preferred embodiments, the ionic surfactant employed herein is sodium dodecylbenzene sulfonate. The ionic surfactant may be present in an amount of 5-4,000 mM, preferably 15-2,000 mM, preferably 30-800 mM, preferably 50-400 mM, preferably 75-200 mM relative to a total volume of the bismuth mixture. In one or more embodiments, a molar ratio of the bismuth(III) salt to the ionic surfactant present in the bismuth mixture is in the range of 1:2 to 3:1, preferably 1:1 to 2:1, preferably 5:4 to 3:2, or about 4:3.

The method disclosed herein also involves mixing a metavanadate salt and a basic aqueous solution to form a vanadate mixture. Exemplary metavanadate salts that may be suitable for the method described herein include, but are not limited to, ammonium metavanadate, sodium metavanadate, potassium metavanadate, silver metavanadate, cesium metavanadate, and the like. In one embodiment, more than one type of metavanadate salt may be used. Preferably, the metavanadate salt is ammonium metavanadate. The metavanadate salt may be present in an amount of 10-5,000 mM, preferably 25-2,500 mM, preferably 50-1,000 mM, preferably 75-500 mM, preferably 100-250 mM relative to a total volume of the vanadate mixture. In one or more embodiment, a molar ratio of the bismuth(III) salt present in the bismuth mixture to the metavanadate salt present in the vanadate mixture is in the range of 1:2 to 2:1, preferably 2:3 to 3:2, preferably 4:5 to 5:4, or about 1:1.

The basic aqueous solution comprises a base. The base employed herein may be a hydroxide base, such as an alkali metal hydroxide (e.g., lithium hydroxide, sodium hydroxide, potassium hydroxide, rubidium hydroxide, and cesium hydroxide), an alkali earth metal hydroxide (e.g., magnesium hydroxide, calcium hydroxide, strontium hydroxide, and barium hydroxide), and an ammonium hydroxide (e.g., ammonium hydroxide, tetramethylammonium hydroxide, triethylammonium hydroxide, trimethylanilinium hydroxide, etc.). Preferably, the base is sodium hydroxide. In one embodiment, the base employed herein has a molarity of 0.25-4 M, preferably 0.5-3 M, more preferably 1-2.5 M, or about 2 M. In a further embodiment, the pH of the vanadate mixture may be in a range of 9-14, 10-13.8, 11-13.5, 12-13.2, or 12.5-13. Most preferably, the pH of the vanadate mixture is about 14.

The acidic aqueous solution and the basic aqueous solution may each comprise water as a solvent. The water may be tap water, distilled water, bidistilled water, deionized water, deionized distilled water, reverse osmosis water, and/or some other water. In one embodiment, the water is bidistilled to eliminate trace metals. Preferably the water is bidistilled, deionized, deionized distilled, or reverse osmosis water and at 25° C. has a conductivity at less than 10 $\mu$S·cm$^{-1}$, preferably less than 1 $\mu$S·cm$^{-1}$, a resistivity greater than 0.1 M$\Omega$·cm, preferably greater than 1 M$\Omega$·cm, more preferably greater than 10 M$\Omega$·cm, a total solid concentration less than 5 mg/kg, preferably less than 1 mg/kg, and a total organic carbon concentration less than 1000 $\mu$g/L, preferably less than 200 $\mu$g/L, more preferably less than 50 $\mu$g/L. In an alternative embodiment, other solvents, such as alcohols (e.g., methanol, ethanol, i-propanol, n-butanol) may be used in addition to, or in lieu of the water to form the bismuth mixture and the vanadate mixture. The mixing steps described above may occur by stirring, shaking, sonicating, blending, or by otherwise agitating the mixture.

The method also involves the step of adding the vanadate mixture to the bismuth mixture to form a reaction mixture that is simultaneously subjected to ultrasonication. In one embodiment, the vanadate mixture is added to the bismuth mixture to form a reaction mixture at an addition rate in a range of 1-1,000 $\mu$L/s, preferably 5-500 $\mu$L/s, preferably 10-250 $\mu$L/s, preferably 20-125 $\mu$L/s, preferably 30-100 $\mu$L/s, preferably 40-80 $\mu$L/s, preferably 45-60 $\mu$L/s, or about 50 $\mu$L/s. However, in certain embodiments, the addition rate may be less than 1 $\mu$L/s or greater than 1,000 $\mu$L/s. Preferably, adding the vanadate mixture to the bismuth mixture occurs at the same time as ultrasonicating the reaction mixture, which means that the addition and the ultrasonication steps occur in a single operation. In one embodiment, the bismuth mixture is ultrasonicated prior to and during the addition of the vanadate mixture.

The ultrasonicating may last for a period of time sufficient to form the bismuth vanadate particles, but not so long as to compromise the photoelectrochemical properties of the particles. Typically, the ultrasonicating is performed from about 0.5 to about 60 minutes, preferably from about 1 to about 30 minutes, preferably from about 2 to about 15 minutes, preferably from about 3 to about 10 minutes, preferably from about 4 to about 8 minutes, preferably from about 5 to about 6 minutes. However, in certain embodiments, the ultrasonicating may last less than 0.5 minutes or longer than 60 minutes. In one embodiment, the ultrasonicating is stopped once the addition of the vanadate mixture to the bismuth mixture is completed.

In preferred embodiments, the reaction mixture is subjected to ultrasonication at a frequency in a range of 10-100 kHz, preferably 15-75 kHz, preferably 16-50 kHz, preferably 17-25 kHz, preferably 17.5-22.5 kHz, preferably 18-22 kHz, preferably 18.5-21.5 kHz, preferably 19-21 kHz, preferably 19.5-20.5 kHz, or about 20 kHz. In other embodiments, sonication with frequencies lower than 10 kHz or higher than 100 kHz may be used. The ultrasonication may be carried out in an ultrasonic bath, with an ultrasonic probe, or using an ultrasonic processor. The ultrasonication may be applied by inserting an ultrasonic probe into the reaction mixture or by placing a container of the reaction mixture into a sonication bath. In a preferred embodiment, an ultrasonic probe (e.g., Branson 450 digital Sonifier®, Branson Ultrasonics Corporation, Danbury, CT, USA) is used herein.

The ultrasonicating may be continuous, pulsed, or modulated in some way. Preferably the ultrasonicating performed herein is pulsed. In one embodiment, the pulsed ultrasonicating treatment comprises alternating on and off cycles, wherein each on cycle is 3-10 seconds long, preferably 4-8 seconds long, more preferably 5-6 seconds long, and each off cycle is 0.5-5 seconds long, preferably 1-4 seconds long, more preferably 2-3 seconds long. Here, the "on cycle" means that the ultrasonication is applied to the reaction mixture, while the "off cycle" means that no ultrasonication is applied.

It is worth noting that parameters such as amplitude of ultrasonication may impact the morphology and photoelectrochemical properties of the resulting bismuth vanadate particles. In at least one embodiment, the ultrasonicating described herein is performed using Branson 450 Digital Sonifer equipped with Branson 101-147-041 Solid Exponential Horn for Sonifier Cell Disruptor (½" Tip Diameter, 10-65 Amplitude Range, 10-250 ml Volume). Accordingly, bismuth vanadate particles resulting from ultrasonication performed at an amplitude of about 10% (typically, an amplitude ranging from about 18 to about 23 microns for an ultrasonicator equipped with a horn of 0.5 inch diameter) have fused structures (see FIGS. 3A-B) and consist essentially of crystalline $BiVO_4$ having a distorted monoclinic crystal symmetry, while bismuth vanadate particles resulting from ultrasonication performed at an amplitude of about 30% (typically, an amplitude ranging from about 40 to about 48 microns for an ultrasonicator equipped with a horn of 0.5 inch diameter) have an irregular contour that is cracked (see FIGS. 3E-F) and consist essentially of crystalline $BiVO_4$ having a distorted monoclinic crystal symmetry. On the other hand, bismuth vanadate particles resulting from ultrasonication performed at an amplitude of about 20% (typically, an amplitude ranging from about 28 to about 35 microns for an ultrasonicator equipped with a horn of 0.5 inch diameter) are in the form of octahedrons having a microscopically smooth surface (see FIGS. 3C-D) and consist essentially of crystalline $BiVO_4$ having a tetragonal crystal symmetry.

In preferred embodiments, the reaction mixture is subjected to ultrasonication at an amplitude in a range of 8-35%, preferably 9-32%, preferably 10-30%, preferably 12-28%, preferably 14-26%, preferably 16-24%, preferably 17-23%, preferably 18-22%, preferably 19-21%, or about 20%. In preferred embodiments, the reaction mixture is subjected to ultrasonication at an amplitude in a range of 18-22%, preferably 19-21%, more preferably about 20%, and the bismuth vanadate particles consist essentially of crystalline $BiVO_4$ having a tetragonal crystal symmetry.

The method also involves the step of hydrothermally treating the reaction mixture, thereby forming the bismuth vanadate particles. In one embodiment, the reaction mixture is hydrothermally treated via heating in an autoclave at a temperature of 80-300° C., preferably 90-275° C., preferably 100-250° C., preferably 125-200° C., preferably 150-175° C., or about 160° C. for 0.1-6 hours, preferably 0.5-3 hours, more preferably 1-2 hours to produce a reaction mass. The reaction mass may be separated by filtration, centrifugation, decantation, and the like, and optionally washed with water and/or ethanol. An external heat source, such as an oven, a heating mantle, a water bath, or an oil bath, may be employed to dry the reaction mass of the present disclosure. Alternatively, the reaction mass may be air dried. The reaction mass may be dried, for instance, in an oven at a temperature of 40-100° C., preferably 50-80° C., more preferably 55-70° C., or about 60° C. for 3-36 hours, preferably 6-24 hours, or about 12 hours to form the bismuth vanadate particles. In one embodiment, the bismuth vanadate particles are dried via heating in air. Alternatively, the bismuth vanadate particles are dried in oxygen-enriched air, an inert gas, or a vacuum.

According to a second aspect, the present disclosure relates to a $BiVO_4$ photoelectrode comprising a conducting substrate, and bismuth vanadate particles present on a surface of the conducting substrate. The bismuth vanadate particles may be adsorbed on the surface (e.g. via van der Waals and/or electrostatic forces) of the conducting substrate.

In one embodiment, the bismuth vanadate particles of the $BiVO_4$ photoelectrode are made by the method of the first aspect of the disclosure. Thus, the bismuth vanadate particles may have sizes, dimensions, morphologies, and properties as those previously described. In preferred embodiments, the bismuth vanadate particles have an octahedral shape and comprising, or consisting essentially of crystalline $BiVO_4$ having a tetragonal crystal symmetry. In one embodiment, the bismuth vanadate particles of the $BiVO_4$ photoelectrode have an average particle size in a range of 0.8-6 μm, preferably 1-5.5 μm, preferably 1.5-5 μm, preferably 2-4.5 μm, preferably 2.5-4 μm, preferably 3-3.5 μm.

The bismuth vanadate particles may be evenly arranged on the surface of the conducting substrate. A distance measured from a center of a bismuth vanadate particle to a center of a neighboring bismuth vanadate particle may be in a range of 10-5,000 nm, 20-2,000 nm, 50-1,000 nm, 100-500 nm, or 200-300 nm. In one or more embodiments, the bismuth vanadate particles are present on the surface of the conducting substrate at a density of 5-200/μm², 10-150/μm², 25-100/μm², or 50-80/μm². Energy-dispersive X-ray spectroscopy, X-ray microanalysis, elemental mapping, transmission electron microscopy, scanning electron microscopy, and scanning transmission electron microscopy may be useful techniques for observing the arrangement and coverage density of the bismuth vanadate particles on the conducting substrate.

In a most preferred embodiment, the conducting substrate is fluorine-doped tin oxide (FTO) film. Other exemplary substrates include indium tin oxide (ITO) film, ITO coated polyethylene terephthalate (PET) film, a gold film, gold coated glass, aluminum oxide, titanium oxide, nickel oxide, tungsten oxide, strontium titanate, quartz, and silicon wafer. In some embodiments, the conducting substrate is selected from the group consisting of FTO (fluorine-doped tin oxide), ITO (indium tin oxide), AZO (aluminum-doped zinc oxide), GZO (gallium-doped zinc oxide), IZO (indium zinc oxide), IZTO (indium zinc tin oxide), IAZO (indium aluminum zinc oxide), IGZO (indium gallium zinc oxide), IGTO (indium gallium tin oxide), and ATO (antimony tin oxide). The conducting substrate may be of any desirable shape, such as, a circle, a triangle, a rectangle, a pentagon, a hexagon, an irregular polygon, a circle, an oval, an ellipse, or a multilobe. Preferably, the conducting substrate is rectangular in shape. The conducting substrate may be attached to an additional support, such as a glass slide.

The layer of bismuth vanadate particles present on the conducting substrate may have an average thickness in a range of 0.5-5 μm, preferably 0.7-4 μm, more preferably 0.8-3 μm, even more preferably 0.9-2 μm, or about 1 μm. In one embodiment, the thickness of the layer of bismuth vanadate particles may vary from location to location on the $BiVO_4$ photoelectrode by 1-30%, 5-20%, or 8-10% relative to the average thickness of the layer of bismuth vanadate particles. In a preferred embodiment, 70-100%, more preferably 80-99%, even more preferably 85-97% of the surface of the conducting substrate is covered with the bismuth vanadate particles, though in some embodiments, less than 70% of the surface of the conducting substrate is covered with the bismuth vanadate particles.

The $BiVO_4$ photoelectrode may be prepared by depositing the bismuth vanadate particles onto the conducting substrate. The bismuth vanadate particles may be deposited onto the conducting substrate via various techniques known by those of ordinary skill in the art including, without limitation, Langmuir-Blodgett technique, chemical vapor deposition, atomic layer deposition, chemical solution deposition by dip coating, spin coating or spraying, sputter deposition, cathodic arc deposition, pulsed laser deposition, lithography, and thermal evaporation method. The Langmuir-Blodgett technique has been used to form particle monolayers at the water-air interface and to transfer them onto a solid support. Preferably, the depositing is accomplished by the Langmuir-Blodgett technique (see Example 4 for experimental details).

According to a third aspect, the present disclosure relates to a photoelectrochemical cell comprising the $BiVO_4$ photoelectrode of the second aspect, a counter electrode, and an electrolyte solution containing water and an inorganic salt in contact with both the $BiVO_4$ photoelectrode and the counter electrode. As used herein, the $BiVO_4$ photoelectrode may be considered as a working electrode in the photoelectrochemical cell.

In one embodiment, the photoelectrochemical cell is a vessel having an internal cavity for holding the electrolyte solution. The vessel may be cylindrical, cuboid, frustoconical, spherical, or some other shape. The vessel walls may comprise a material including, but not limited to, glass, quartz, polypropylene, polyvinyl chloride, polyethylene, and/or polytetrafluoroethylene. In a preferred embodiment, a vessel with a transparent window is used. For example, the window may comprise glass or quartz, though in one embodiment, a polymeric material transparent to visible light and chemically stable with the reaction mixture may be used. As defined herein, "transparent" refers to an optical quality of a compound wherein a certain wavelength or range of wavelengths of light may traverse through a portion of the compound with a small loss of light intensity. Here, the "transparent window" may causes a loss of less than 10%, preferably less than 5%, more preferably less than 2% of the intensity of a certain wavelength or range of wavelengths of light. In one embodiment, the vessel wall and window may comprise the same material, for example, a vessel may comprise quartz walls, which may also function as transparent windows. The internal cavity may have a volume of 2-100 mL, preferably 2.5-50 mL, more preferably 3-20 mL. In another embodiment, the internal cavity may have a volume of 100 mL-50 L, preferably 1-20 L, more preferably 2-10 L. In another embodiment, for instance, for pilot plant testing, the internal cavity may have a volume of 50-10,000 L, preferably 70-1,000 L, more preferably 80-2,000 L. In another embodiment, the internal cavity may have a volume larger than 2,000 L. In one embodiment, one or more photoelectrochemical cells may be connected to each other in parallel and/or in series. In another embodiment, the electrolyte solution may be in contact with more than one working electrode and/or more than one counter electrode.

In one embodiment, the counter electrode comprises platinum, gold, silver, or carbon. In a preferred embodiment, the counter electrode comprises platinum. In one embodiment, the counter electrode may be in the form of a wire, a rod, a cylinder, a tube, a scroll, a sheet, a piece of foil, a woven mesh, a perforated sheet, or a brush. The counter electrode may be polished in order to reduce surface roughness or may be texturized with grooves, channels, divots, microstructures, or nanostructures. In at least one embodiment, where the counter electrode comprises platinum, the counter electrode is in the form of a wire. In some embodiments, the counter electrode may comprise some other electrically-conductive material such as gold, platinum-iridium alloy, iridium, titanium, titanium alloy, stainless steel, and cobalt alloy. As defined herein, an "electrically-conductive material" is a substance with an electrical resistivity of at most $10^{-6}$ Ω·m, preferably at most $10^{-7}$ Ω·m, more preferably at most $10^{-8}$ Ω·m at a temperature of 20-25° C. In a preferred embodiment, the counter electrode has at least one outer surface comprising an essentially inert, electrically conducting material, such as platinum, gold, silver, or carbon. In another preferred embodiment, the counter electrode may comprise solid platinum, gold, or carbon. The material of the counter electrode should be sufficiently inert to withstand the chemical conditions in the electrolyte solution without substantially degrading during a photoelectrochemical reaction.

In one embodiment, the electrolyte solution has an inorganic salt concentration of 0.05-1 M, preferably 0.1-0.8 M, preferably 0.2-0.7 M, preferably 0.4-0.6 M, or about 0.5 M, though in some embodiments, the inorganic salt may be present at a concentration less than 0.05 M or greater than 1 M. The inorganic salt may be $Na_2SO_4$, $K_2SO_4$, $ZnSO_4$, LiCl, NaCl, KCl, $NaClO_4$, $KNO_3$, $NaNO_3$, $NH_4Cl$, $NH_4NO_3$, $LiPF_6$, $MgCl_2$, or some other inorganic salt. Preferably the inorganic salt is $Na_2SO_4$. In an alternative embodiment, an inorganic acid such as HCl, $HClO_4$, $HNO_3$, or $H_2SO_4$ may be used in addition to, or in lieu of the inorganic salt. In another alternative embodiment, an inorganic base such as LiOH, NaOH, KOH, or $NH_3$ may be may be used in addition to, or in lieu of the inorganic salt. In one or more embodiments, the electrolyte solution has a pH in a range of 5-9, preferably 6-8, more preferably a pH at about 7. In an alternative embodiment, the electrolyte solution has a pH less than 5 or greater than 9.

In one embodiment, the photoelectrochemical cell further comprises a reference electrode in contact with the electrolyte solution. A reference electrode is an electrode which has a stable and well-defined electrode potential. The high stability of the electrode potential is usually reached by employing a redox system with constant (buffered or saturated) concentrations of each relevant species of the redox reaction. A reference electrode may enable a potentiostat to deliver a stable voltage to the working electrode or the counter electrode. The reference electrode may be a saturated calomel electrode (SCE), a standard hydrogen electrode (SHE), a normal hydrogen electrode (NHE), a reversible hydrogen electrode (RHE), a copper-copper(II) sulfate electrode (CSE), a silver chloride electrode (Ag/AgCl), a pH-electrode, a palladium-hydrogen electrode, a dynamic hydrogen electrode (DHE), a mercury-mercurous sulfate electrode, or some other type of electrode. In a preferred embodiment, a reference electrode is present and is a silver chloride electrode (Ag/AgCl). However, in certain embodiments, the photoelectrochemical cell does not comprise a reference electrode.

In one or more embodiments, the $BiVO_4$ photoelectrode has a photo-current density in a range of 0.1-1.5 $mA/cm^2$, preferably 0.15-1.2 $mA/cm^2$, preferably 0.2-1.0 $mA/cm^2$, preferably 0.3-0.9 $mA/cm^2$, preferably 0.4-0.8 $mA/cm^2$, preferably 0.5-0.7 $mA/cm^2$ when the photoelectrochemical cell is subjected to a bias potential of 0.5-1.3 V vs RHE, preferably 0.7-1.29 V vs RHE, preferably 0.9-1.28 V vs RHE, preferably 1.0-1.27 V vs RHE, preferably 1.1-1.26 V vs RHE, preferably 1.2-1.25 V vs RHE, or about 1.23 V vs RHE under visible light irradiation.

In one or more embodiments, the $BiVO_4$ photoelectrode has a photo-to-current conversion efficiency (IPCE) in a range of 2-25%, preferably 4-22%, preferably 6-20%, preferably 8-18%, preferably 10-16%, preferably 12-14% when the photoelectrochemical cell is subjected to a bias potential of 0.5-1.3 V vs RHE, preferably 0.7-1.29 V vs RHE, preferably 0.9-1.28 V vs RHE, preferably 1.0-1.27 V vs RHE, preferably 1.1-1.26 V vs RHE, preferably 1.2-1.25 V vs RHE, or about 1.23 V vs RHE under visible light irradiation. In one or more embodiments, the $BiVO_4$ photoelectrode has an applied bias photo-to-current efficiency (ABPE) in a range of 0.02-0.3%, preferably 0.05-0.28%, preferably 0.1-0.26%, preferably 0.15-0.25%, preferably 0.2-0.23% when the photoelectrochemical cell is subjected to a bias potential of 0.6-0.9 V vs RHE, preferably 0.7-0.85 V vs RHE, preferably 0.74-0.8 V vs RHE, preferably 0.76-0.78 V vs RHE, or about 0.77 V vs RHE under visible light irradiation.

In one embodiment, a $BiVO_4$ photoelectrode comprising bismuth vanadate particles made by the currently disclosed method using ultrasonication at an amplitude in a range of 18-22%, preferably 19-21%, more preferably about 20% (herein referred to as "a first $BiVO_4$ photoelectrode") has higher current density, photo-to-current conversion efficiency, and/or applied bias photo-to-current efficiency than those of the $BiVO_4$ photoelectrode comprising bismuth vanadate particles made by an otherwise identical method using ultrasonication at an amplitude of less than 18% (e.g., an amplitude in a range of 8-14%, 9-12%, or about 10%) or greater than 22% (e.g., an amplitude in a range of 25-35%, 28-32%, or about 30%) (herein referred to as "a second $BiVO_4$ photoelectrode"). For example, over the same range of electrical potential and in similar electrochemical cells, the first $BiVO_4$ photoelectrode may have (i) a current density that is 2-9 times greater, preferably 3-8 times greater, preferably 4-7 times greater, preferably 5-6 times greater than that of the second $BiVO_4$ photoelectrode under visible light irradiation (see FIGS. 5A-B), and/or (ii) a photo-to-current conversion efficiency that is 1.5-15 times greater, preferably 2-12 times greater, preferably 4-10 times greater, preferably 6-8 times greater than that of the second $BiVO_4$ photoelectrode under visible light irradiation (see FIG. 5E).

In certain embodiments, visible light irradiation may be performed by a light source internal or external to the photoelectrochemical cell and may provide the photon energy necessary to activate the photocatalytic material of the photoelectrochemical cell in any of its embodiments. The light source may be any known light source including, but not limited to, natural solar sunlight, simulated solar light, UV light, laser light, incandescent light, and the like. Exemplary light sources include, but are not limited to, a xenon lamp such as a xenon arc lamp and a xenon flash lamp, a mercurial lamp, a metal halide lamp, an LED lamp, a solar simulator, and a halogen lamp. In certain embodiments, two or more light sources may be used. In a preferred embodiment, a simulated solar light may be used as the light source. In another preferred embodiment, natural sunlight may be used as the light source. The light may have a wavelength of 300-800 nm, 310-700 nm, preferably 320-600 nm, more preferably 340-400 nm. The light source may comprise one or more wavelengths within the range of 300-800 nm. Preferably a light source is used which emits a broad wavelength range of light and which comprises a portion or the entire ultraviolet and visible light spectrum. A light source may additionally emit light of wavelengths below 300 nm and/or above 800 nm. In one embodiment, a filter may be used to prevent UV light from entering the reaction mixture, for example, a filter that blocks light with wavelengths less than 300 nm may be used with a simulated solar light, xenon, or a mercury gas discharge lamp. Alternatively, a light source may be used which only emits light within the ultraviolet and/or visible spectrum. The light source may emit a total power of 50-2,000 W, preferably 100-1,500 W, more preferably 300-1,000 W, and may be positioned 2-30 cm, preferably 5-20 cm, more preferably 8-15 cm from the closest surface of the $BiVO_4$ photoelectrode. In a preferred embodiment, the light source has an intensity of 500-4000 $W/m^2$, preferably 700-2000 $W/m^2$, more preferably 900-1500 $W/m^2$, or about 1000 $W/m^2$ (100 $mW/cm^2$, 1 SUN power).

According to a fourth aspect, the present disclosure relates to a method of splitting water into $H_2$ and $O_2$. The method involves subjecting the photoelectrochemical cell of the third aspect to a bias potential of 0.5-2.0 V, preferably 0.6-1.8 V, preferably 0.7-1.6 V, preferably 0.8-1.4 V, preferably 0.9-1.3 V, preferably 1-1.2 V, and concurrently irradiating the photoelectrochemical cell with visible light, thereby forming $H_2$ and $O_2$. In some embodiments, the photoelectrochemical cell is subjected to a potential less than 0.5 V or greater than 2.0 V.

Photoelectrochemical water splitting dissociates water into its constituent parts, hydrogen ($H_2$) and oxygen ($O_2$), by applying a potential to a photoelectrochemical cell under either artificial or natural light. The process generally involve a photoelectrocatalyst absorbing a photon with sufficient energy (above 1.23 eV, $\lambda < \sim 1000$ nm), subsequently permitting photoexcited electrons and holes to separate and migrate to the surface of the photoelectrocatalyst material, reducing adsorbed species (i.e. water). Photo-assisted water splitting processes involve the interaction of light with the valence band electrons of the photoelectrocatalyst material, which get excited to the conduction band by absorbing the photon and leave the electron vacancy ("positive hole") in place. These electron-hole pairs contribute to water reduction and oxidation.

Irradiating the photoelectrochemical cell with visible light during water splitting may be performed by the aforementioned light source internal or external to the photoelectrochemical cell. The light source may comprise one or more wavelengths within the range of 300-800 nm. The light source may additionally emit light of wavelengths below 300 nm and/or above 800 nm. For example, a simulated solar light may be used as the light source. For another example, natural sunlight may be used as the light source. The light source may emit a total power of 50-2000 W, preferably 100-1500 W, more preferably 300-1000 W.

In one embodiment, the aforementioned method of splitting water into hydrogen gas and oxygen gas involves subjecting the photoelectrochemical cell to a bias potential of 0.1-2.5 V, preferably 0.25-2.0 V, preferably 0.4-1.5 V, preferably 0.6-1.25 V, preferably 0.8-1.0 V, and concurrently irradiating the photoelectrochemical cell with visible light for 0.1-24 hours, 0.5-18 hours, 1-12 hours, 2-11 hours, 3-10 hours, 4-9 hours, 5-8 hours, or 6-7 hours.

Preferably, the counter electrode (e.g. the platinum wire) functions as the photocathode by receiving a negative potential to reduce water into $H_2$ gas and $OH^-$, while the $BiVO_4$ photoelectrode functions as the photoanode by receiving a positive potential to oxidize OFF into $O_2$ gas and $H_2O$.

In one embodiment, the method further comprises a step of separately collecting $H_2$-enriched gas and $O_2$-enriched gas. In one embodiment, the space above each electrode may be confined to a vessel in order to receive or store the produced gases from one or both electrodes. The collected gas may be further processed, filtered, or compressed. Preferably the $H_2$-enriched gas is collected above the photocathode, and the $O_2$-enriched gas is collected above the photoanode. In one embodiment, the $H_2$-enriched gas and the $O_2$-enriched gas are not 100 vol % $H_2$ and 100 vol % $O_2$, respectively. For example, the enriched gas may also comprise $N_2$ from air, and water vapor and other dissolved gases from the electrolyte solution. The $H_2$-enriched gas may also comprise $O_2$ from air. The $H_2$-enriched gas may comprise greater than 20 vol % $H_2$, preferably greater than 40 vol % $H_2$, more preferably greater than 60 vol % $H_2$, even more preferably greater than 80 vol % $H_2$, relative to a total volume of the receptacle collecting the produced $H_2$ gas. The $O_2$-enriched gas may comprise greater than 20 vol % $O_2$, preferably greater than 40 vol % $O_2$, more preferably greater than 60 vol % $O_2$, even more preferably greater than 80 vol % $O_2$, relative to a total volume of the receptacle collecting the produced $O_2$ gas. In some embodiments, the produced gases may be bubbled into a vessel comprising water or some other liquid, and a higher concentration of $H_2$ or $O_2$ may be collected. In one embodiment, produced $O_2$ and $H_2$, or $H_2$-enriched gas and $O_2$-enriched gas may be collected in the same vessel.

The examples below are intended to further illustrate protocols for preparing, characterizing the bismuth vanadate particles, $BiVO_4$ photoelectrode, photoelectrochemical cell, and uses thereof, and are not intended to limit the scope of the claims.

Example 1

Synthesis of $BiVO_4$: Sonochemical Synthesis of Octahedral $BiVO_4$

The sonochemical synthesis of monodisperse $BiVO_4$ microstructures was performed using a probe ultrasonic sonicator (Branson450 Digital) with varying % amplitude followed by hydrothermal treatment according to the synthesis protocol shown in FIG. 1. Branson 450 Digital Sonifer used herein was equipped with Branson 101-147-041 Solid Exponential Horn for Sonifier Cell Disruptor, ½" Tip Diameter, 10-65 Amplitude Range, 10-250 ml Volume.

For a typical synthesis of BV-20, solution A containing 0.1 M $Bi(NO_3)_3 \cdot 5H_2O$ (Sigma Aldrich) and 0.075 M of sodium dodecylbenzene sulfonate (SDBS, $C_{18}H_{29}NaO_3S$) (Sigma Aldrich) was prepared in 4 M nitric acid (10 mL). In addition, solution B containing 0.1 M solution of $NH_4VO_3$ was prepared by dissolving ammonium metavanadate ($NH_4VO_3$) (Sigma Aldrich) in 2 M sodium hydroxide (10 mL). Solution B, which was stored in a 20 mL vial, was added into solution A dropwise with the help of 1 mL Insulin Syringe (BD Micro-Fine). The solution A was kept under sonication until complete addition of the solution B. The sonication amplitude was set to 20% with a 5 s On and 2 s OFF cycle. After the addition completed, the vial was removed from the sonicator and the precipitate was hydrothermally treated in a Teflon-lined stainless-steel autoclave with an operating temperature of 160° C. for 1 h. After 1 h, the oven was switched off and allowed to cool down to room temperature. The product was centrifuged (10,000 RPM) and washed several times with DI water and once with ethanol, followed by drying at 60° C. for 12 h. The other samples (BV-10 and BV-30) were prepared in the same fashion except the sonication amplitude was changed to 10% and 30%, respectively.

Example 2

Synthesis of $BiVO_4$: Hydrothermal Synthesis of Octahedral $BiVO_4$ (H-BV)

To compare the morphology of $BiVO_4$ prepared without employing sonication, while keeping the other parameters unchanged, the hydrothermal approach was used alone. In this method, the BiVO4 microstructures (H-BV) were synthesized using an autoclave operating at 160° C. For the synthesis of H-BV, two separate solutions of the same concentrations were prepared by adopting the procedure of Example 1. Ammonium metavanadate solution (solution B) was slowly added to the acidified solution of bismuth nitrate containing sodium dodecyl benzoate (solution A). After complete addition, the precipitate was transferred to a Teflon-lined stainless-steel autoclave and kept under the operating temperature of 160° C. for 12 h. After 12 h, the oven was switched off and the product was allowed to cool. The obtained product was centrifuged at (10,000 RPM) and washed several times with DI water followed by ethanol to remove any unwanted impurities, which was followed by drying at 60° C. for 12 h. The H-BV product was obtained as yellow color powder and stored for further characterization.

Example 3

Morphological and Structure Assessment

The phase structure and crystallinity characterization of the microstructural octahedral $BiVO_4$ were analyzed using a Cu Ká λ=0.15406 nm radiation from high-resolution X-ray diffractometer (XRD, Rigaku MiniFlex). The samples were scanned from 2θ=10° to 80° at a scan rate of 0.05 degree/min. The Raman spectra were obtained on a Horiba Yvon Lab RAM HR 800 spectrometer (Olympus BX41 microscope and a CCD detector) in 800-2000 cm$^{-1}$ with 633 nm excitation wavelength. All Raman spectra were analyzed in backscattering geometry at a resolution of 0.5 cm$^{-1}$ in the range between 150 and 1200 cm$^{-1}$. The morphological characterizations were obtained on a field emission scanning electron microscope LYRA 3 Dual Beam instrument operated at an acceleration voltage of 20 kV (Tescan). The lattice fringes were observed by the transmission electron microscope (JEOL JEM 2100F).

Example 4

Photoanodes Fabrication

Figure 7A:
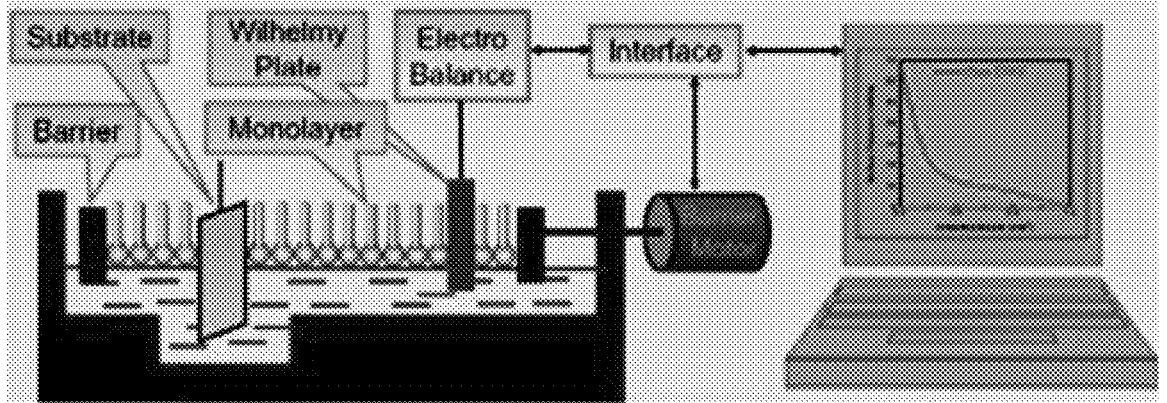
FIG. 7A is a diagrammatic representation of a Langmuir-Blodgett (LB) deposition device.
Figure 7B:
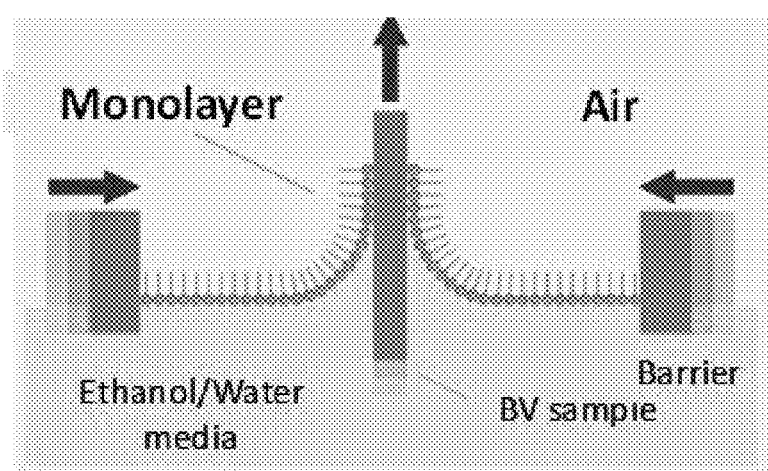
FIG. 7B illustrates a detailed procedure for a LB deposition.

The Langmuir-Blodgett (LB) deposition method was considered for the monolayer photoanode fabrication of BV-10, BV20, and BV30 photoanodes. The LB deposition method offers a combination of controlled deposition, applicability to a wide range of substrates, and usability under ambient conditions [A. Modlińska, D. Bauman, The Langmuir-Blodgett Technique as a Tool for Homeotropic Alignment of Fluorinated Liquid Crystals Mixed with Arachidic Acid, Int. J. Mol. Sci. 12 (2011) 4923-4945; L. J. Cote, F. Kim, J. Huang, Langmuir-blodgett assembly of graphite oxide single layers, J. Am. Chem. Soc. 131 (2009) 1043-1049; and L. Xu, A. R. Tetreault, H. H. Khaligh, I. A. Goldthorpe, S. D. Wettig, M. A. Pope, Continuous Langmuir—Blodgett Deposition and Transfer by Controlled Edge-to-Edge Assembly of Floating 2D Materials, Langmuir. 35 (2019) 51-59]. The detailed procedure is provided in FIGS. 7A and 7B. In a typical LB deposition, a 1:5 water/ethanol mixture was used in the sink. After various trials, it was realized that 20 μL of BV10, BV20, and BV30 in the water/ethanol mixture generated the maximum photocurrent density, and hence the inventors utilized this amount of BV samples in each LB film deposition (see FIG. 1). The mixing was facilitated by sonicating the mixture for 30 minutes in the table bath sonicator. The final supernatant contained BV10, BV20, and BV30 microparticles, respectively, for each deposition. The neat and cleaned Nima Technology, model 116 was used for LB deposition (see FIG. 7A for a diagrammatic representation of the device).

In each case, the BV mixture was carefully supplied/spread to the surface of the water using dropwise approach through a low volume micro-syringe with a spreading rate of 50 μLmin$^{-1}$ until 10 mL. The pressure was maintained by the device automatically and film compression was done using barriers speed of 10 cm$^2$ min$^{-1}$. The BV monolayer was transferred to FTO substrates by vertically dipping the substrate in and pulling it out at the rate of 2 mm·min$^1$ at selective points during the compression. Due to the partially hydrophilic nature of the BV material, LB deposition proceeded effectively. The monolayer deposited BV10/FTO, BV20/FTO, and BV30/FTO photoanodes were dried at 80° C. for 1 h. Bi- and poly-layered BV/FTO depositions were also attempted, but the resulting photoanodes could not achieve high photocurrent response. Hence only the monolayer deposited BV10/FTO, BV20/FTO, and BV30/FTO photoanodes were further explored.

Example 5

Photoelectrochemical Measurements

Photoelectrochemical measurements were conducted on a CHI 760E electrochemical workstation (Shanghai Chenhua, China) with a three-electrode configuration. A platinum wire and a standard Ag/AgCl electrode were used as a counter electrode and a reference electrode, respectively. The working electrode (photoanode) was a fluorine-doped tin oxide (FTO) glass coated with the sample film with an active area of 1 cm$^2$. The visible-light source was a 300 W Xe lamp with an ultraviolet filter. A 0.5 M Na$_2$SO$_4$ aqueous solution was used as the electrolyte solution.

Linear sweep voltammetry (LSV) measurements were conducted under visible light illumination at a scan rate of 5 mV s$^{-1}$. The transient photocurrent was measured at a constant potential of 1.23 V vs. RHE for each ON/OFF switching event of visible light. Electrochemical impedance spectroscopy (EIS) was carried out in a frequency range of 0.01-105 Hz under open-circuit conditions. The electrode potential versus Ag/AgCl electrode was converted to the reversible hydrogen electrode (RHE) scale, using the following equation (1).

$$E_{RHE}E_{Ag/AgCl}+0.059 \text{ pH}+0.197. \tag{1}$$

% incident photon-current conversion efficiency (IPCE) measurements were conducted via Newport Xe lamp (300 W) coupled with a resolving mono-chromator (Oriel Cornerstone having 1.0 mm slits). A calibrated Si photodiode by Thorlabs FDS1010-CAL was used to examine the intensity output during photoresponse measurements, in the PEC cell setup having three electrodes. The acquired photocurrent results at each wavelength ($I_{photo}$) were converted to % IPCE according to equation (2).

$$\% \ IPCE = \frac{1240 \times I \text{ photo}}{\lambda \times I \text{ incident}}.100\% \tag{2}$$

where I photo, I incident and λ in equation (2) are the measured photocurrent density (mA/cm$^2$), incident light intensity (mW/cm$^2$), and incident photon wavelength (nm), respectively.

Example 6

Role of Ultrasonication

Figure 2A:
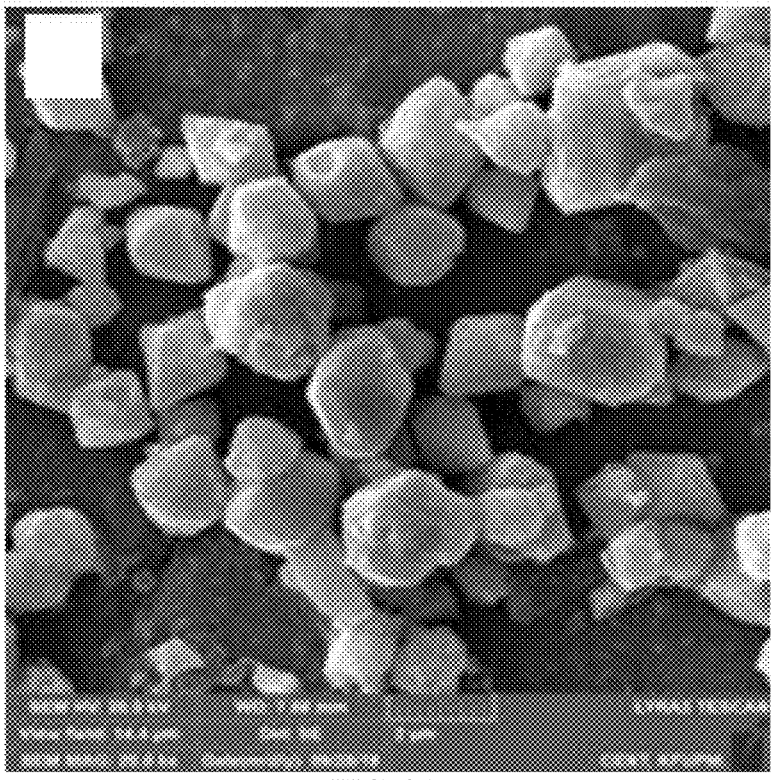
FIG. 2A is a large area, low resolution field emission scanning electron microscope (FESEM) image of bismuth vanadate H-BV particles prepared via hydrothermal treatment (see Example 6 for detailed description of H-BV particles).
Figure 2B:
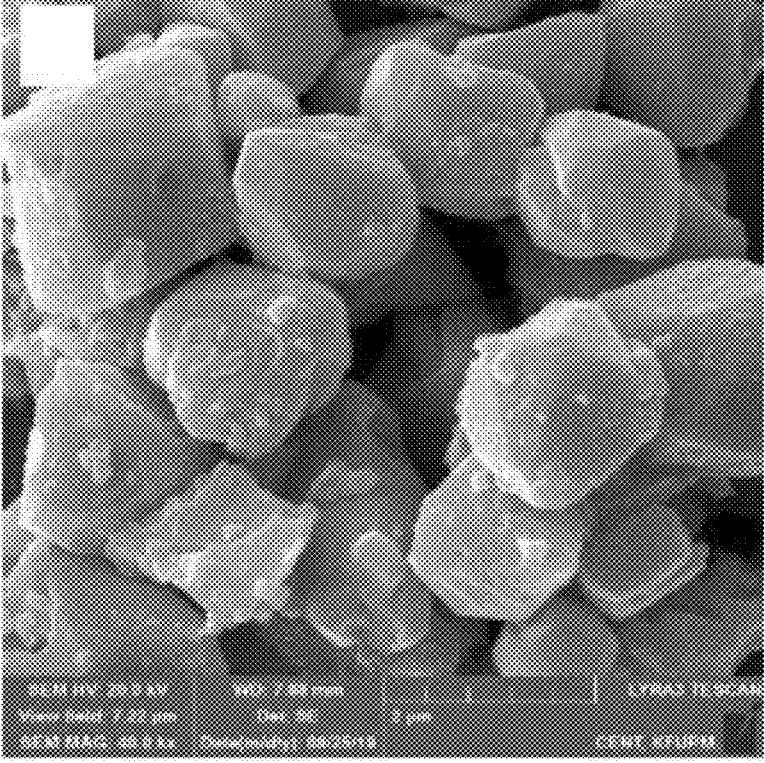
FIG. 2B is a high resolution FESEM image of the H-BV particles.
Figure 2C:
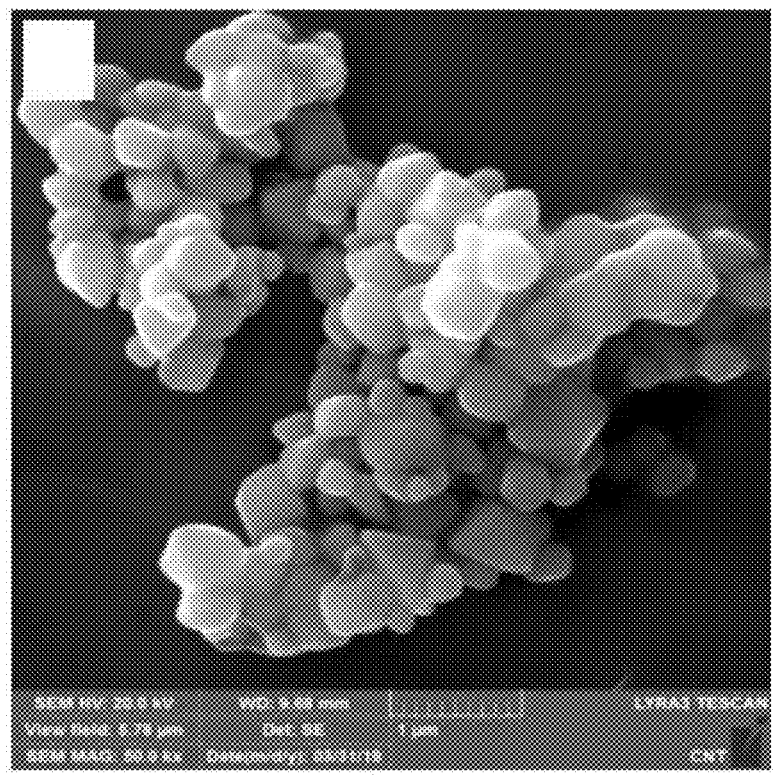
FIG. 2C is a large area, low resolution FESEM image of H-BV particles after ultrasonication treatment.
Figure 2D:
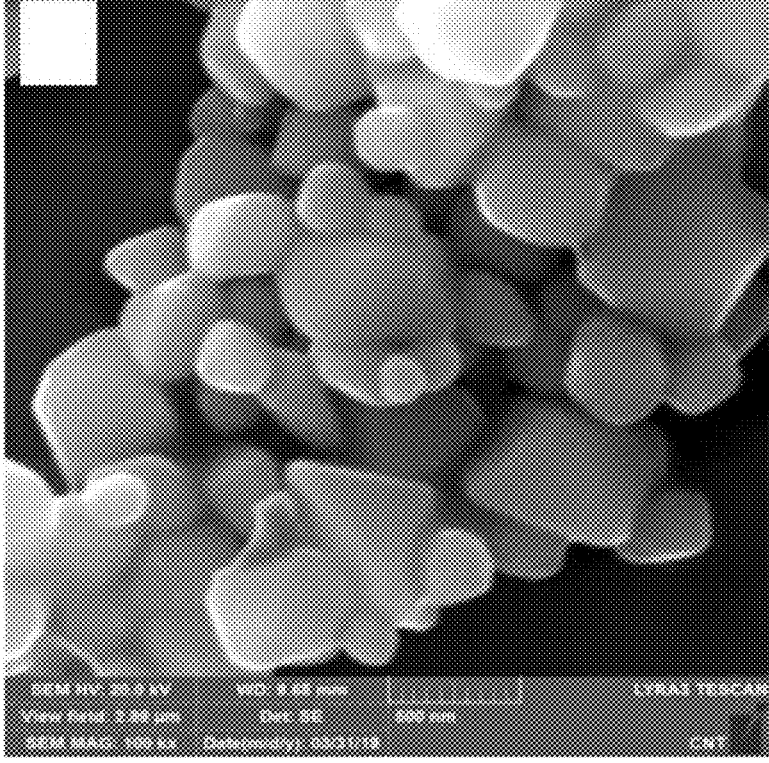
FIG. 2D is a high resolution FESEM image of the H-BV particles after ultrasonication treatment.

FESEM images in FIGS. 2A-D indicate that the hydrothermal synthesis produced highly dispersed nanoparticles (NPs) of high quality. However, these NPs prepared via the hydrothermal treatment alone had variable morphologies with particle sizes of 4-5 μm. As shown in FIGS. 2A and 2B, the hydrothermally synthesized BV samples (H-BV) had irregular pseudo cubical shapes, and agglomerations were also observed at a larger scale. The surface of the larger H-BV NPs was rough as smaller NPs were observed to be present over the larger NPs. To see the aftereffect of ultrasonication, these samples (i.e., H-BV) were subjected to ultrasonication and then observed via FESEM. As shown in FIGS. 2C and 2D, small NPs which were previously present on the surface of large H-BV NPs were removed, leading to a smooth surface. Nevertheless, the post-ultrasonication treatment led to almost 10 times decrease in the particle size (0.2-0.5 μm), yet, the particle morphologies were still inconsistent and disintegrated. Therefore, it could be suggested that post-ultrasonication demonstrated more control over particle size but less impact on morphologies of BV particles once the particles have grown to their maximum limit in specific crystallites and facets.

The ultrasonic-assisted synthesis and dispersion of NPs is another technique used herein [I. Khan, S. Ali, M. Mansha, A. Qurashi, Sonochemical assisted hydrothermal synthesis of pseudo-flower shaped Bismuth vanadate (BiVO$_4$) and their solar-driven water splitting application, Ultrason. Sonochem. 36 (2017) 386-392; I. Khan, A. A. M. Ibrahim, M. Sohail, A. Qurashi, Sonochemical assisted synthesis of RGO/ZnO nanowire arrays for photoelectrochemical water splitting, Ultrason. Sonochem. 37 (2017) 669-675; H. ullah, I. Khan, Z. H. Yamani, A. Qurashi, Sonochemical-driven ultrafast facile synthesis of SnO 2 nanoparticles: Growth mechanism structural electrical and hydrogen gas sensing properties, Ultrason. Sonochem. 34 (2017) 484-490; I. Khan, A. Qurashi, Sonochemical-Assisted In Situ Electrochemical Synthesis of Ag/α-Fe$_2$O$_3$/TiO$_2$ Nanoarrays to Harness Energy from Photoelectrochemical Water Splitting, ACS Sustain. Chem. Eng. 6 (2018) 11235-11245; and K. Saeed, I. Khan, Preparation and properties of single-walled carbon nanotubes/poly(butylene terephthalate) nanocomposites, Iran. Polym. J. 23 (2014) 53-58, each incorporated herein by reference in their entirety]. The high energy ultrasonic waves transferred through the reaction media can cause cavitation phenomena. Cavitation is a crucial step during ultrasonication as the formation, growth, and implosive collapse of microbubbles/cavities in the medium are generated during this step. High energy is released due to collapsing bubbles/cavities and hence generates a localized hotspot region. It has been reported that this region could generate a temperature and a pressure as high as 5000 K and 1000 bar, respectively [I. M. Mahbubul, T. H. Chong, S. S. Khaleduzzaman, I. M. Shahrul, R. Saidur, B. D. Long, M. A. Amalina, Effect of Ultrasonication Duration on Colloidal Structure and Viscosity of Alumina—Water Nanofluid, Ind. Eng. Chem. Res. 53 (2014) 6677-6684; J. S. Taurozzi, V. A. Hackley, M. R. Wiesner, Ultrasonic dispersion of nanoparticles for environmental, health and safety assessment— issues and recommendations, Nanotoxicology. 5 (2011) 711-729; Y. Zhang, R. Li, X. Li, Y. Yang, P. Chen, F. Dong, R. Jiang, Possible Effects and Mechanisms of Ultrasonic Cavitation on Oxide Inclusions during Direct-Chill Casting of an Al Alloy, Metals (Basel). 8 (2018) 814; and M. Sivakumar, A. B. Pandit, Wastewater treatment: a novel energy efficient hydrodynamic cavitational technique, Ultrason. Sonochem. 9 (2002) 123-131, each incorporated herein by reference in their entirety]. The high energy thermodynamics could lead to desired transformation and dispersion of the agglomerated particles in a fluid matrix.

However, as reported by Mahbubul et al., standard protocols are compulsory to use ultrasonic for more fruitful results [I. M. Mahbubul, T. H. Chong, S. S. Khaleduzzaman, I. M. Shahrul, R. Saidur, B. D. Long, M. A. Amalina, Effect of Ultrasonication Duration on Colloidal Structure and Viscosity of Alumina—Water Nanofluid, Ind. Eng. Chem. Res. 53 (2014) 6677-6684, incorporated herein by reference in its entirety]. Determination of parameters such as ultrasonic intensity, duration, external temperature, and pressure are important for sufficient output. Therefore, the role of pulse ultrasonication and its intensity has been comprehensively investigated herein, and the resulting BV NPs were compared with H-BV NPs synthesized via the simple hydrothermal method. As stated previously, bismuth vanadate samples, i.e., BV10, BV20, and BV30 were prepared utilizing 10%, 20%, and 30% ultrasonic amplitudes, respectively, while keeping the pulse rate constant.

Figure 3A:
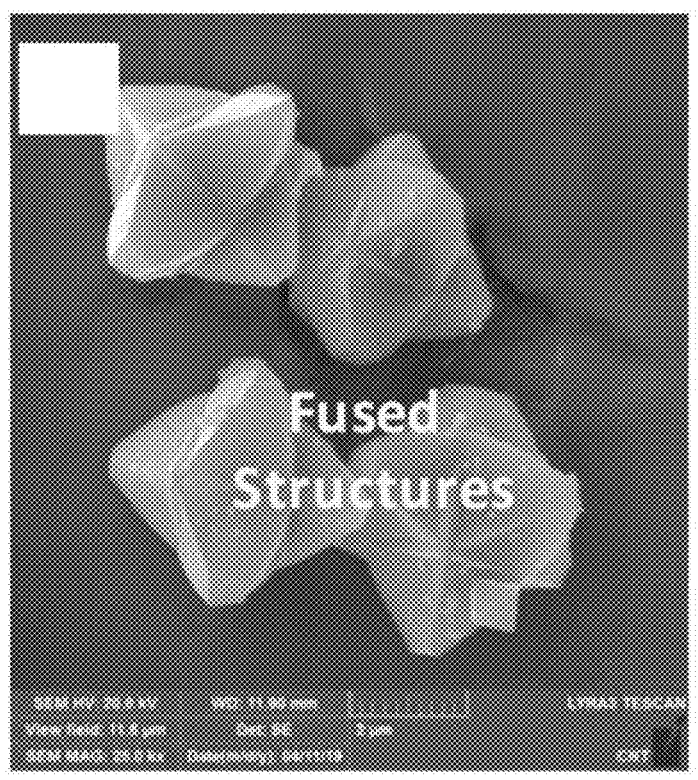
FIG. 3A is a large area, low resolution FESEM image of bismuth vanadate BV10 particles prepared via ultrasonication at an amplitude of 10% and hydrothermal treatment.
Figure 3B:
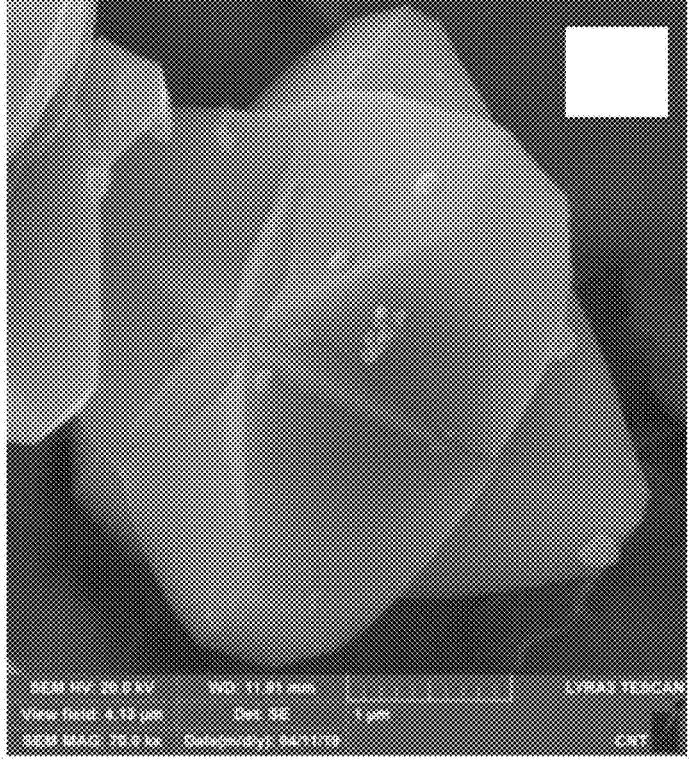
FIG. 3B is a high resolution FESEM image of the bismuth vanadate BV10 particles.
Figure 3C:
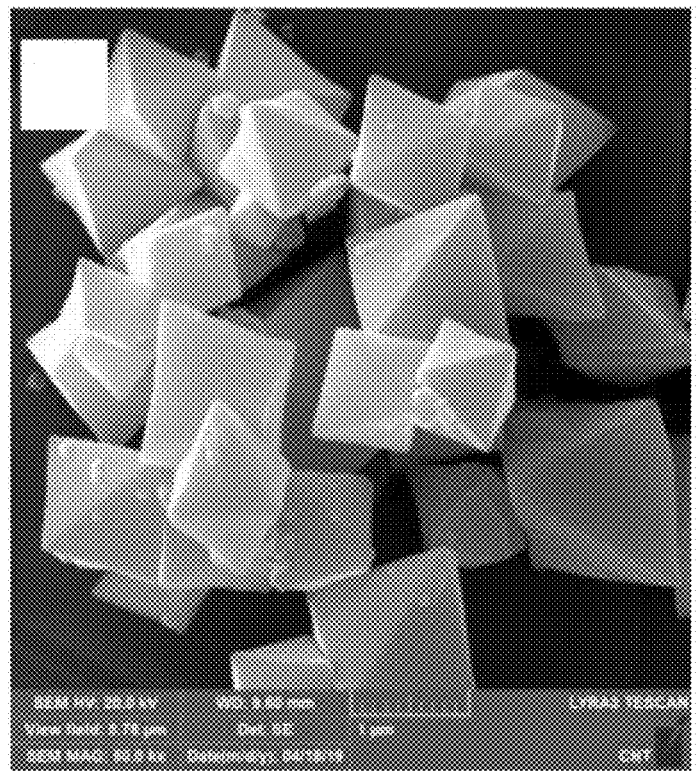
FIG. 3C is a large area, low resolution FESEM image of bismuth vanadate BV20 particles prepared via ultrasonication at an amplitude of 20% and hydrothermal treatment.

The morphological features of BV NPs were compared with the H-BV samples (prepared without sonication, while keeping the other parameters unchanged). As shown in FIGS. 3A and 3B, it can be seen that the initial ultrasonication with the lower pulse ultrasonic energy amplitude intensity of 10% led to the seeds formation. However, once these seeds grew into particles the energy amplitude was not large enough to overcome their separation, and hence BV10 NPs acquired showed fused morphologies and large particle sizes. In addition, the particle barriers of BV10 can be observed visibly, which could influence its photoactive characteristics, and hence overall water splitting performance (discussed later).

To separate the larger grown particles, the ultrasonic amplitude intensity was increased to 20%. Surprisingly, BV20 NPs having highly dispersed large-scale octahedral shaped microstructures with an average particle size of 1 micron were achieved (see FIGS. 3C and 3D). Further, monocrystalline BV moieties were obtained for BV20 NPs, which are more active and stable compare to the fused structure. The super-intense cavitation caused by sonication has enabled the precursor's ions to separate faster and led to immense seed formation, which is demonstrated by the dark yellow BV20 solution shown in FIG. 1.

Figure 3D:
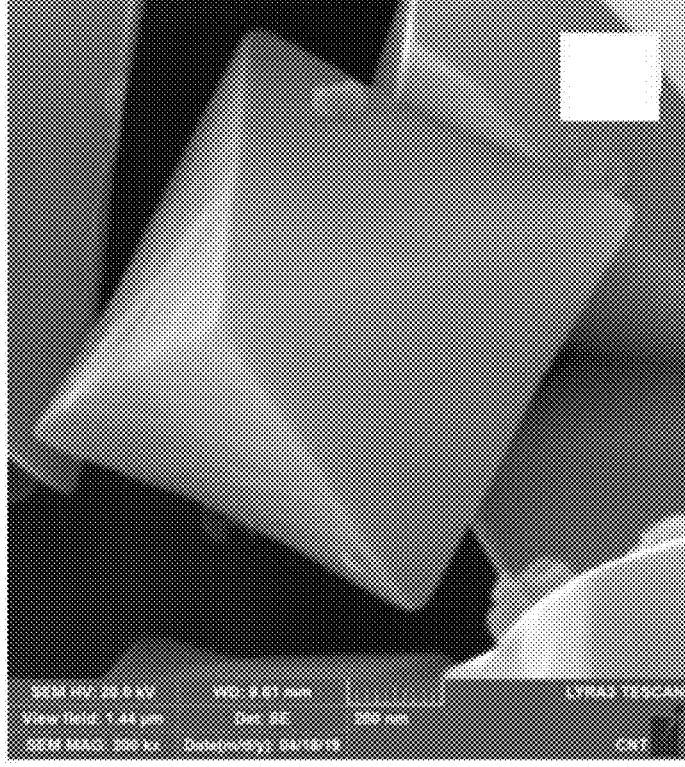
FIG. 3D is a high resolution FESEM image of the bismuth vanadate BV20 particles.
Figure 3E:
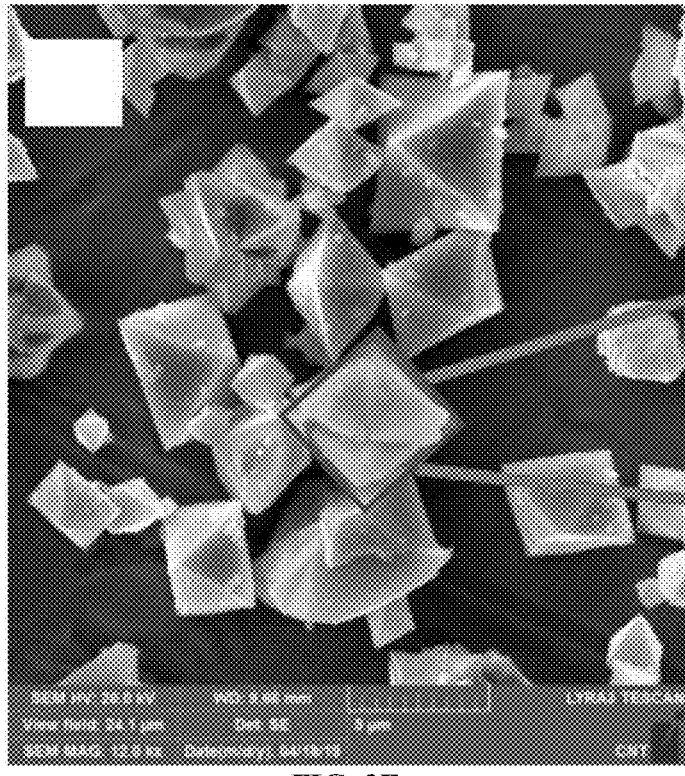
FIG. 3E is a large area, low resolution FESEM image of bismuth vanadate BV30 particles prepared via ultrasonication at an amplitude of 30% and hydrothermal treatment.
Figure 3F:
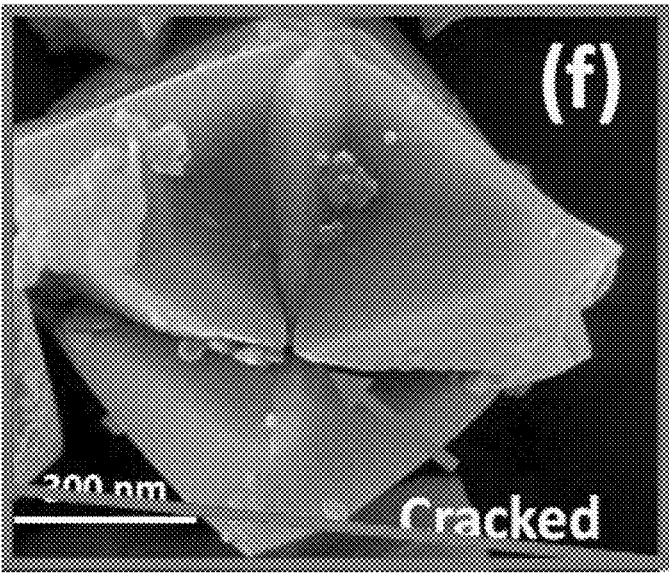
FIG. 3F is a high resolution FESEM image of the bismuth vanadate BV30 particles.

As shown in FIGS. 3E and 3F, additional increase of the ultrasonic amplitude to 30% led to increase in particle size and cracking of the BV30 microparticles. This demonstrated that the additional increase in ultrasonic amplitude has overcome the mechanical stabilities of the formed crystallites and initiated distinct surface breakage. The defected morphologies of BV30 could hinder photoexcitons transport. Hence, BV30 particles may have low photocatalytic activity due to their larger particle size, low surface area, and cracked surfaces. From these results, it was concluded that the ultrasonication having an amplitude intensity of 20% could achieve BV particles (i.e., BV20 NPs) with highly controlled morphologies, which is desirable for many applications.

Example 7

Characteristic Features

Figures 4A, 4B:
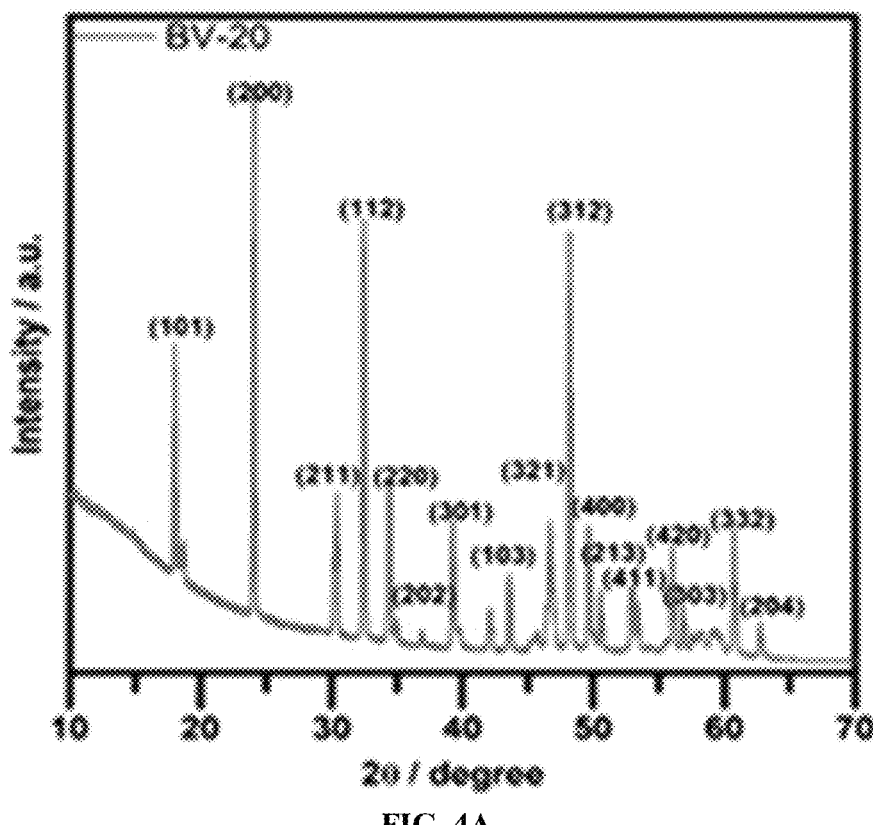
FIG. 4A shows X-ray diffraction (XRD) patterns of bismuth vanadate BV20 particles.
FIG. 4B shows a high-resolution transmission electron microscopy (HRTEM) image of bismuth vanadate BV20 particles.
Figure 4C:
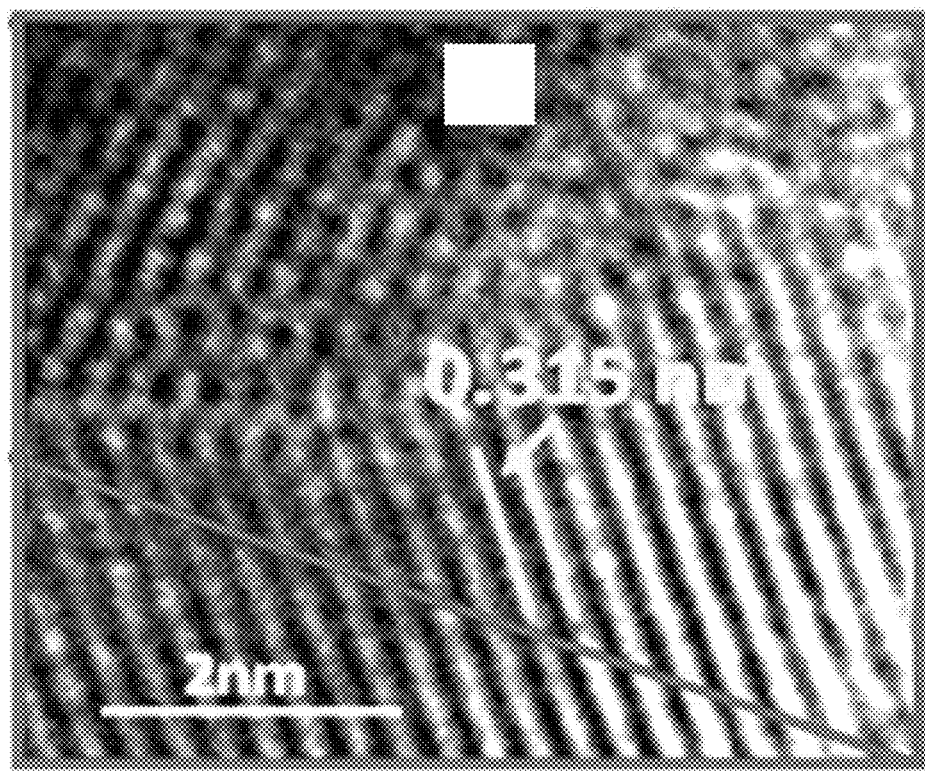
FIG. 4C is a magnified view of the sample in FIG. 4B showing the d-spacing.
Figure 8:
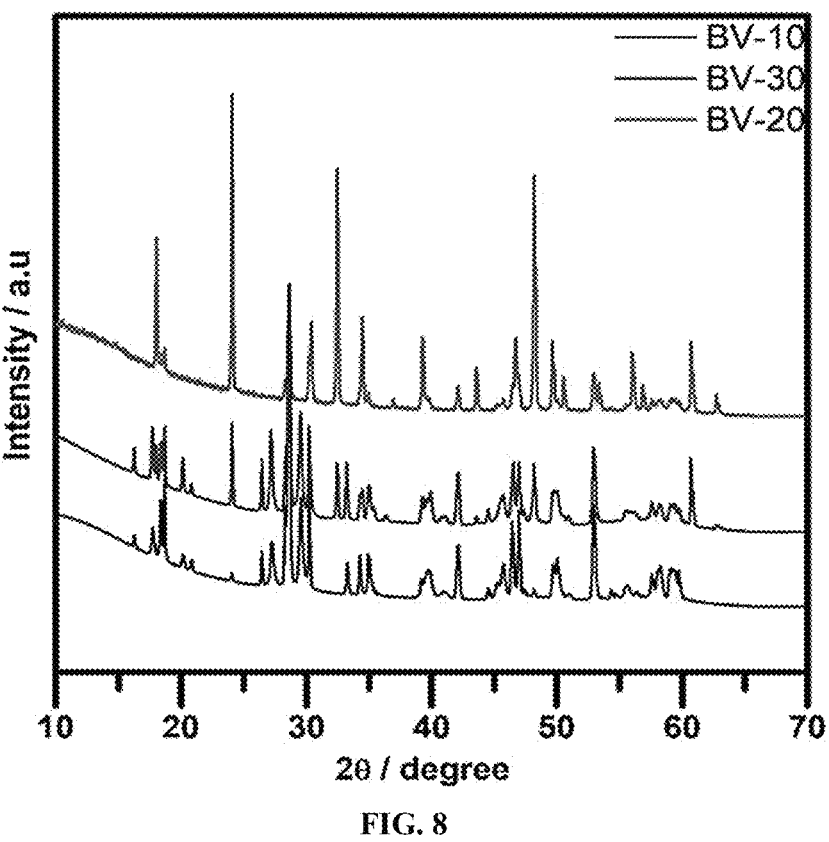
FIG. 8 is an overlay of comparative XRD patterns of BV10, BV20 and BV30 particles.

To further illustrate the morphological and structural characteristics, a series of characterizations were carried out. The comparative XRD patterns for all samples are provided in FIG. 8. It can be seen that BV10 and BV30 particles possessed different diffraction patterns compared to BV20. This indicates their unusual crystalline characteristics of BV20, which were illustrated by the FESEM images as well. The patterns of BV-10 and BV-30 samples matched the distorted monoclinic crystal structure dominantly. However, there are tetragonal contributions in the pattern with space group I2/a(15). The total volume of the cell was 309.52 and the unit parameters for this structure are: a=5.19 Å, b=11.70 Å, c=5.09 Å, with α=90.00°, β=90.38° and γ=90.00°. The diffraction peaks are associated with monoclinic (JCPDS Card No. 14-0688) structure. These irregular patterns of BV10 and BV30 due to mixed crystallites could impact the optoelectrical properties of the material, which will be discussed in the PEC studies below. In comparison, as given in FIG. 4B, BV20 showed exceptionally pure crystallinity, with no observation of monoclinic reflections.

BV20 crystal structure was found to be exactly superimposed with the reported theoretical tetragonal BiVO4 crystal unit, with a space group I41/amd(141) having powder diffraction file (JCPDF) Card No: 00-014-0133 [Y. Park, K. J. McDonald, K. S. Choi, Progress in bismuth vanadate photoanodes for use in solar water oxidation, Chem. Soc. Rev. 42 (2013) 2321-2337; and R. Ran, J. G. McEvoy, Z. Zhang, Synthesis and Optimization of Visible Light Active BiVO$_4$ Photocatalysts for the Degradation of RhB, Int. J. Photoenergy. 2015 (2015) 1-14, each incorporated herein by reference in their entirety], which indicates the high quality of the monocrystalline of BV20 particles. The total volume of the unit cell was 351.15 A and the unit parameters observed were a=7.30 Å, b=7.30 Å, c=6.58 Å, with α=90°, β=90° and $\gamma=90°$. The major diffractions peaks are at angle (2θ) 18° (101), 24° (200), 30° (211), 32° (112), 34° (220), 36° (202), 39° (301), 43° (103), 46° (321), 48° (312), 49° (400), 50° (213), 53° (411), 56° (420), 57° (303), 61° (332), and 63° (204), approximately. The suppression of monoclinic patterns, especially the (121) near 28° exposed facet in BV20 particles, has led to pure tetragonal crystallinity that could impact the overall catalytic performance of the BV20 microcrystals. Moreover, as shown in FIG. 3D, the octahedral morphology of BV20 particles indicates that the 2 tetrahedral units have combined and formed 8 triangles with 8 faces, while 4 of each triangles have connected at the top and bottom central points, respectively.

The XRD data can be further supported by the HR-TEM and selected area electron diffraction (SAED) patterns (FIGS. 3A-F). The image of the BV 20 monocrystal was zoomed to estimate the d-spacing (~0.315 nm), which is well-matched with the lattice spacing of (112) crystal plane. This result further confirms the pure single-crystalline nature of BV20 [Y. Luo, G. Tan, G. Dong, H. Ren, A. Xia, A comprehensive investigation of tetragonal Gd-doped $BiVO_4$ with enhanced photocatalytic performance under sun-light, Appl. Surf. Sci. 364 (2016) 156-165, incorporated herein by reference in its entirety]. On the other hand, BV10 and BV30 showed mixed monoclinic and tetragonal crystal patterns, suggesting the deterioration of the crystallinities due to fusing in BV10 and cracking in BV30, respectively. The results also indicate that the tetragonal facets growth is controlled by the ultrasonic waves, while monoclinic facet growth is extensively affected by the intensity of the ultrasonic waves.

Figure 4D:
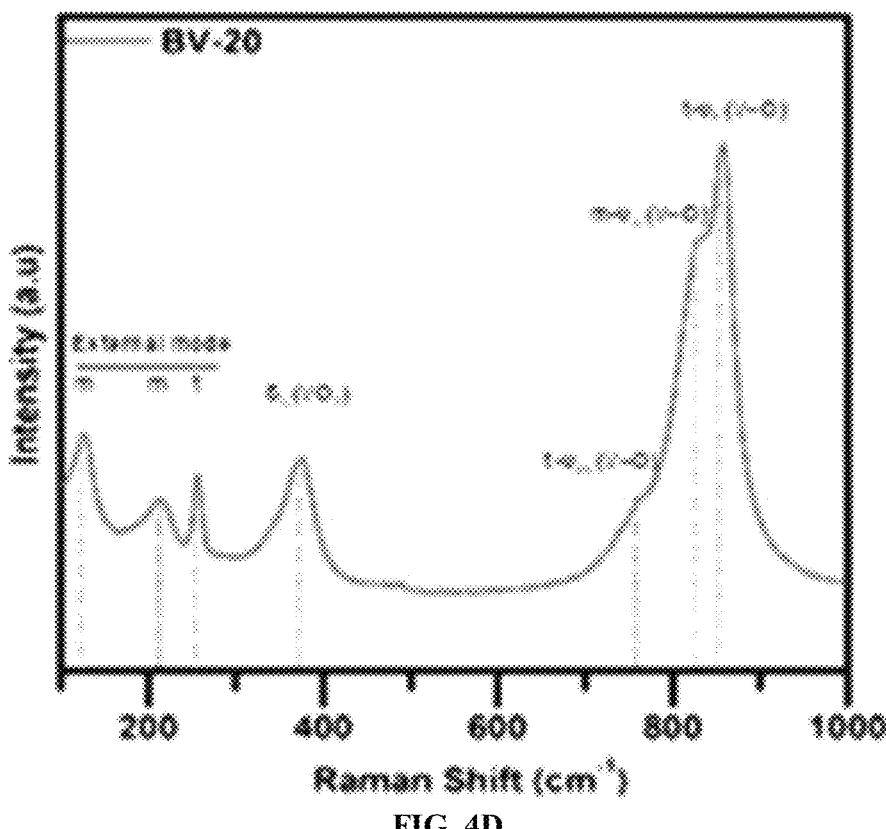
FIG. 4D is a Raman spectrum of bismuth vanadate BV20 particles.
Figure 9:
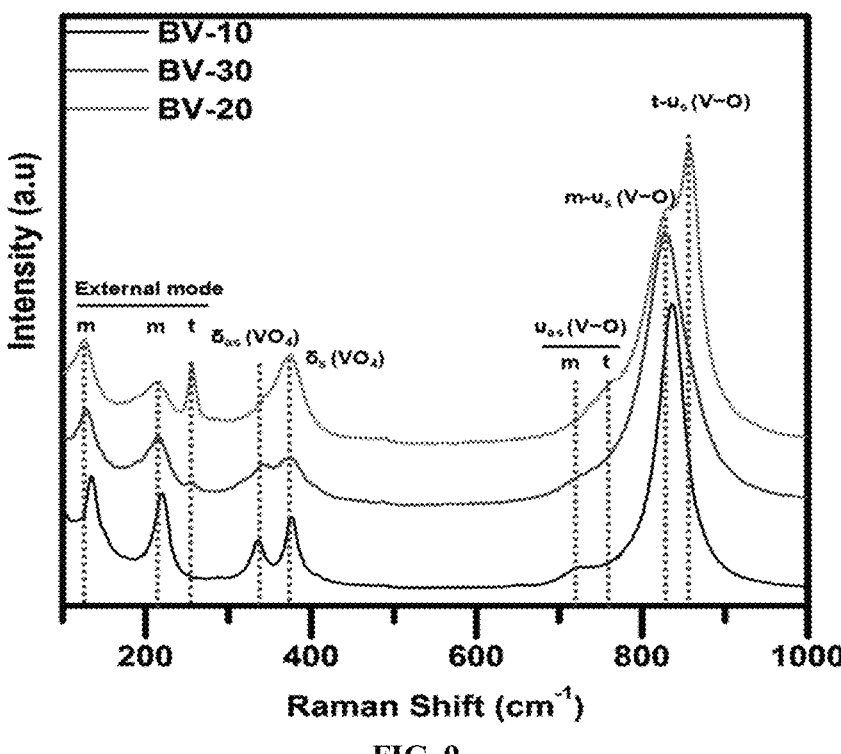
FIG. 9 is an overlay of Raman spectra of BV10, BV20, and BV30 particles.

Raman spectroscopy can provide useful information on the structural, crystallization and local structure of the inspecting material. As illustrated in FIG. 4D, Raman spectra of BV20 photoanode further support its dominant tetragonal crystallinity. In comparison, BV10 and BV30 photoanodes had different Raman bands than BV20. The characteristic tetragonal peak appeared at ~265 $cm^{-1}$ was not found in BV10. While in BV30, the peak was suppressed due to possible crystal defects. Moreover, doublet peaks for BV-10 and BV-30 samples at 336.7 $cm^{-1}$ and 375.9 $cm^{-1}$ are attributed to the symmetric bending mode δs ($VO_4$) and asymmetric bending mode δas ($VO_4$), respectively (see FIG. 9). However, in the case of tetragonal BV20, the doublet bands were observed to transform into a distinct singlet peak. An important Raman band at 832-840 $cm^{-1}$ in the case of BV10, BV20, and BV30, represents the symmetric V—O stretching mode vs (V—O). However, in the case of BV20, this peak was observed to be followed by a strong sharp peak at 834.3 $cm^{-1}$, which is characteristic of tetragonal asymmetric stretching mode vas (V—O). Similarly, BV20 also possesses a very weak band at 757.8 $cm^{-1}$, which is also attributed to the tetragonal contribution. The external modes (rotation/translation) were observed at 214.3 and 126.8 $cm^{-1}$, respectively [A. Zhang, J. Zhang, Hydrothermal processing for obtaining of BiVO4 nanoparticles, Mater. Lett. 63 (2009) 1939-1942; W. Luo, J. Wang, X. Zhao, Z. Zhao, Z. Li, Z. Zou, Formation energy and photoelectrochemical properties of $BiVO_4$ after doping at $Bi^{3+}$ or $V^{5+}$ sites with higher valence metal ions, Phys. Chem. Chem. Phys. 15 (2013) 1006-1013; J. Yu, A. Kudo, Effects of Structural Variation on the Photocatalytic Performance of Hydrothermally Synthesized $BiVO_4$, Adv. Funct. Mater. 16 (2006) 2163-2169; S. Gu, W. Li, F. Wang, H. Li, H. Zhou, Substitution of Ce (III,IV) ions for Bi in $BiVO_4$ and its enhanced impact on visible light-driven photocatalytic activities, Catal. Sci. Technol. 6 (2016) 1870-1881; and J. Huang, G.

Tan, L. Zhang, H. Ren, A. Xia, C. Zhao, Enhanced photocatalytic activity of tetragonal $BiVO_4$: Influenced by rare earth ion $Yb^{3+}$, Mater. Lett. 133 (2014) 20-23, each incorporated herein by reference in their entirety].

Example 8

Photoelectrochemical Water Splitting Performance of BV Photoanodes

Figure 5A:
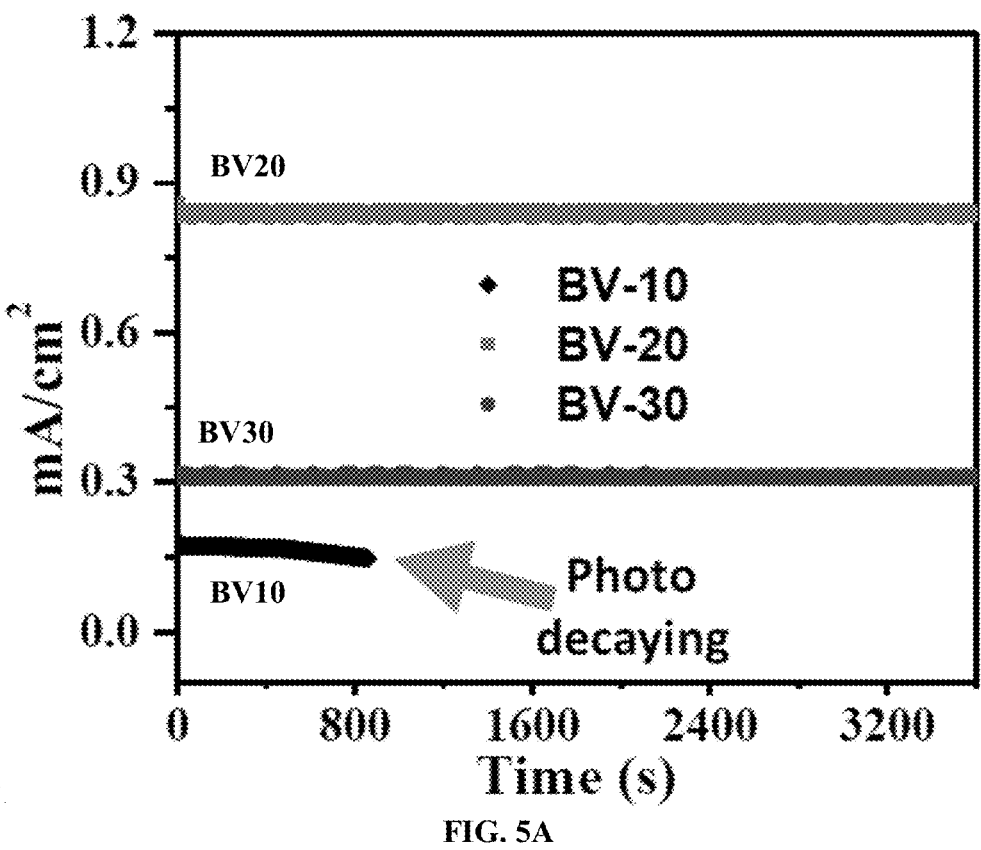
FIG. 5A summarizes photostability of $BiVO_4$ photoelectrodes having bismuth vanadate BV10, BV20, and BV30 particles, respectively, deposited over fluorine-doped tin oxide (FTO) substrate by monitoring their current densities over a period of 3600 seconds.
Figure 5B:
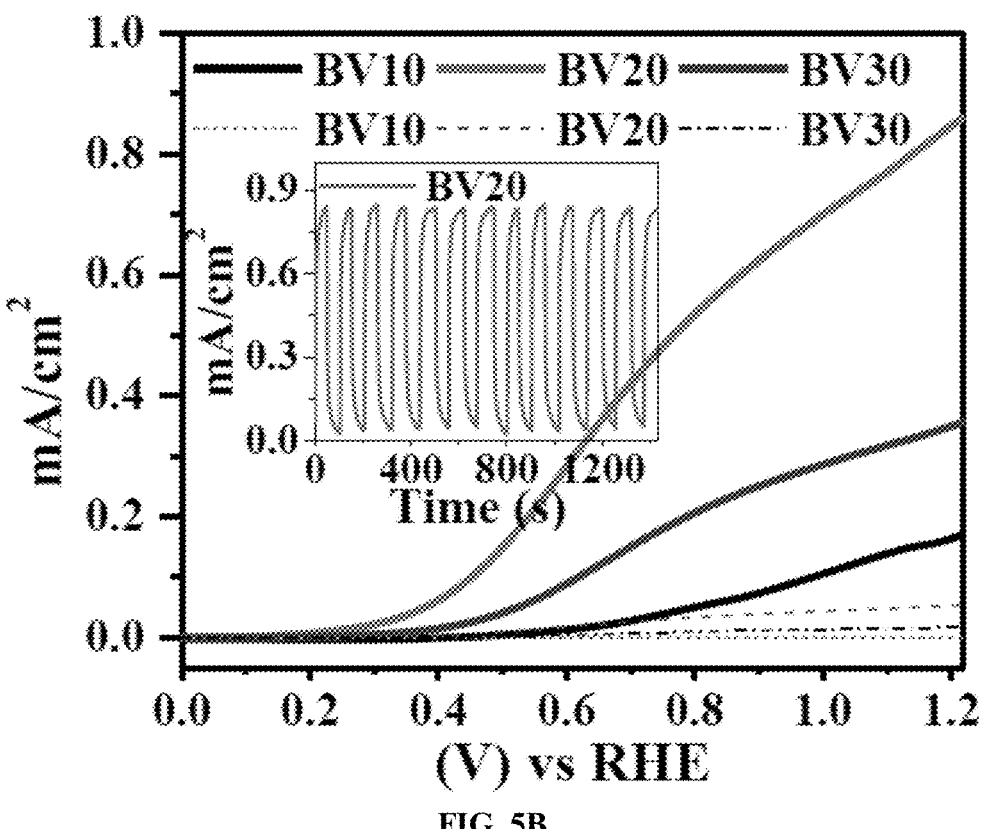
FIG. 5B is an overlay of linear sweep voltammograms (LSV) of $BiVO_4$ photoelectrodes having bismuth vanadate BV10, BV20, and BV30 particles, respectively, deposited over FTO substrate, in a standard three electrode system under simulated solar light (1 SUN) (solid line) and dark (dashed line).

FIGS. 5A-D represent the PEC water splitting performance in terms of (I-V) linear sweep voltammograms (LSV), periodic photoresponse, (I-t) photostability, and electronic impedance spectrometry (EIS) plots, respectively. As mentioned earlier, the photoresponse of the BV materials was recorded under calibrated 1SUN intensity, i.e., AM 1.5 G (100 $mW/cm^2$) illumination using phosphate buffer (0.1 M and pH 7.5). FIG. 5A shows the LSV plots of BV10, BV20, and BV30 photoanodes. It can be confirmed that the slopes of all LSV plots are positive and hence all BV samples are n-type in nature, which is the most abundantly existed electronic structure of BV materials. Further analysis on the plots revealed that BV-20 possesses the highest photocurrent density, i.e. — 0.9 $mAcm^{-2}$, compared to BV10 (0.17 $mAcm^{-2}$) and BV30 (0.33 $mAcm^{-2}$) at 1.23 V vs RHE. Additionally, the onset potential is lowest for BV20 photoanode (339 mV vs RHE), compared to BV10 (441 mV vs RHE) and BV30 (664 mV vs RHE). Importantly, these photocurrent densities were measured without the addition of any co-catalyst, sacrificial agents, and doping of BV samples.

The enhancement in the photocurrent density for BV20 can be attributed to the proper tuning of the intrinsic characteristics of the BV20 photoanode, which leads to sufficient generation and separation of photoexcitons, i.e., electron-hole pairs [S. Lardhi, L. Cavallo, M. Harb, Determination of the Intrinsic Defect at the Origin of Poor $H_2$ Evolution Performance of the Monoclinic $BiVO_4$ Photocatalyst Using Density Functional Theory, J. Phys. Chem. C. 122 (2018) 18204-18211; and J. Safaei, N. A. Mohamed, M. F. M. Noh, M. F. Soh, A. M. Elbreki, N. A. Ludin, M. A. Ibrahim, A. H. A. Al-Waeli, W. N. R. W. Isahak, M. A. M. Teridi, Simultaneous enhancement in light absorption and charge transportation of bismuth vanadate ($BiVO_4$) photoanode via microwave annealing, Mater. Lett. 233 (2018) 67-70, each incorporated herein by reference in their entirety]. The intrinsic properties are proportionally related to the crystallinity and morphology of the BV20 material. The octahedral morphology of BV20 microparticles attributed to the generation of maximum photocurrent density. On the other hand, BV10 showed the lowest photocurrent performance, which further confirms that morphology plays a critical role in photoinduced water oxidation. In this case, as revealed by the SEM images, the fused crystallites leads to importer electronic barriers, which utterly disturb the photoexcitons generation and maximize their recombination. This disturbance not only leads to lower photocurrent but also shifts the onset potential to higher values.

Figure 5C:
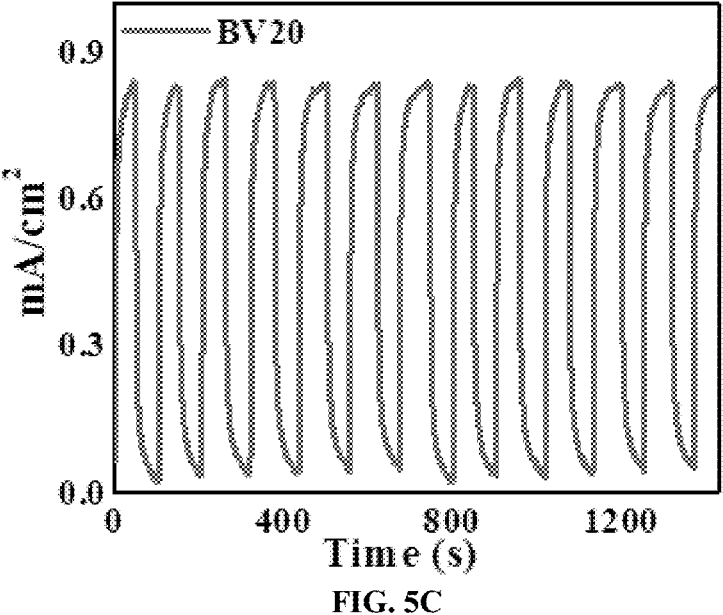
FIG. 5C shows parodic photoresponse of $BiVO_4$ photoelectrode having bismuth vanadate BV20 particles deposited over FTO substrate.

The onset potential values of BV20 and BV30 are relatively close, which could be related to their similar electronic and optical (PEC) characteristics. BV30 showed a photocurrent value of 0.33 $mAcm^{-2}$ at 1.23V vs RHE, which might be caused by the unusual crystal cracking due to high mechanical stress enforced by the high energy ultrasonic waves. The fractured crystal structures of BV30 have some improper defects, which could hurdle charge flow, facilitate charge recombination, and hence lead to a relatively low photocurrent density [M. Liu, L. Wang, P. Dong, L. Dong, X. Wang, J. Joyner, X. Wan, B. I. Yakobson, R. Vajtai, P. Ajayan, P. Spanos, Correlation between types of defects/vacancies of $Bi_2S_3$ nanostructures and their transient photocurrent, Nano Res. 10 (2017) 2405-2414, incorporated herein by reference in its entirety]. As shown in FIG. 5C, the stable parodic photoresponse of BV20 ensures the proper generation of photoexcitons under periodic transient ON/OFF condition. To further elucidate our results, a long term photostability I-t measurements at 1.0V vs RHE was performed (FIG. 5A). BV20 and BV30 were found to be exceptionally stable under light irradiation for at least one hour. However, the BV10 samples experienced serious photocorrosion after stability for a short period of time. As shown in FIG. 5A, BV10 showed significant photodecay after 280 s. These results also confirm the unstable nature of BV10 samples, which is related to the creation of unnecessary barriers that can lead to photorecombination in case of fused crystallites [M. Liu, L. Wang, P. Dong, L. Dong, X. Wang, J. Joyner, X. Wan, B. I. Yakobson, R. Vajtai, P. Ajayan, P. Spanos, Correlation between types of defects/vacancies of $Bi_2S_3$ nanostructures and their transient photocurrent, Nano Res. 10 (2017) 2405-2414, incorporated herein by reference in its entirety]. The monocrystalline BV20 showed considerable stability and resilience for a long period of time. This suggests that the controlled morphology and crystallinity contribute to the flow of photoexcitons and reduction of photorecombination.

Figure 5D:
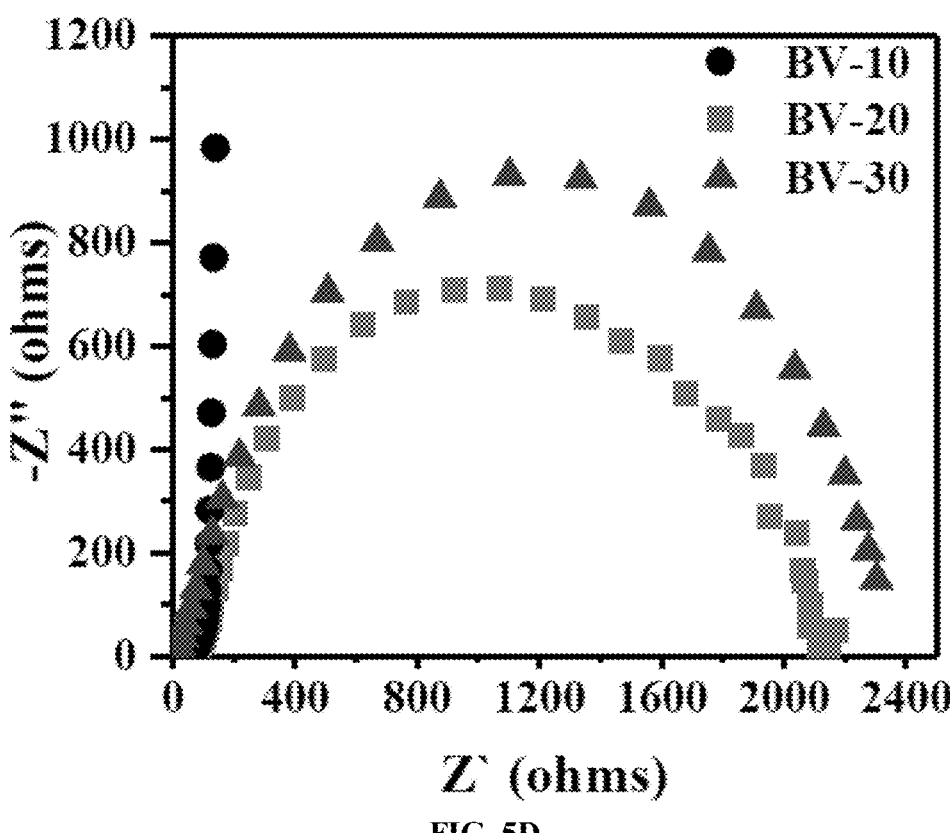
FIG. 5D is an overlay of electronic impedance spectrometry (EIS) Nyquist plots of $BiVO_4$ photoelectrodes having bismuth vanadate BV10, BV20, and BV30 particles, respectively, deposited over FTO substrate.
Figure 5E:
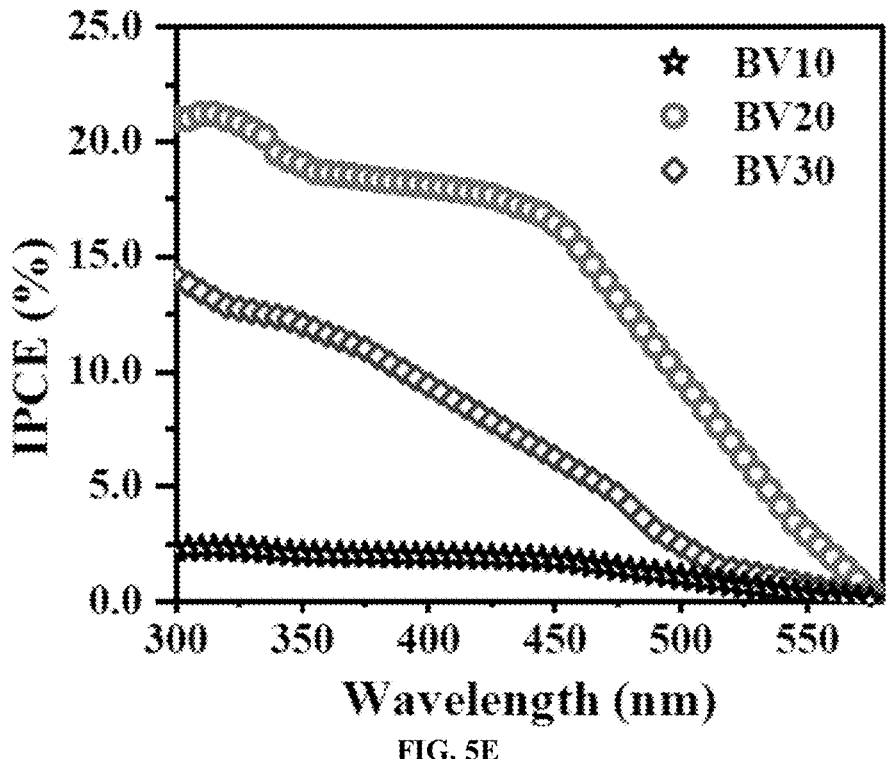
FIG. 5E is an overlay of photo-to-current conversion efficiencies (IPCE) of $BiVO_4$ photoelectrodes having bismuth vanadate BV10, BV20, and BV30 particles, respectively, deposited over FTO substrate upon illumination at different wavelengths.
Figure 6:
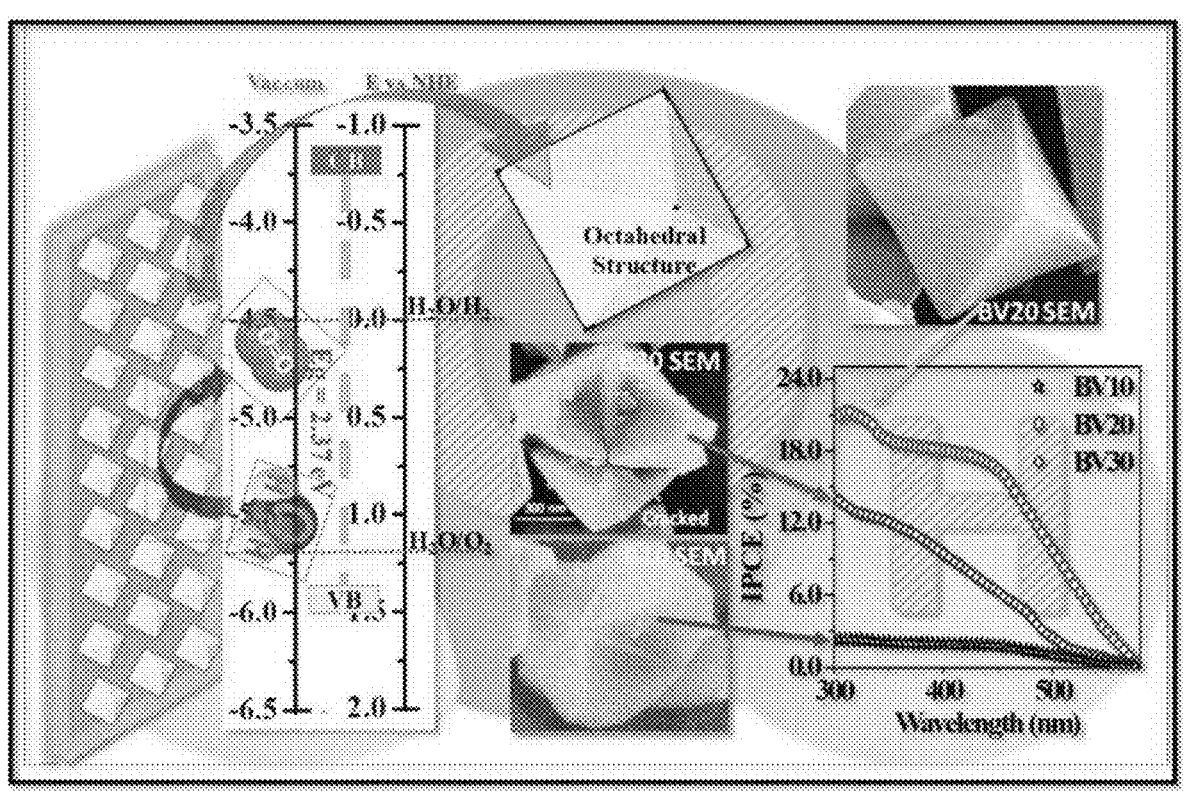
FIG. 6 depicts a proposed process of catalytic water splitting occurring on $BiVO_4$ photoelectrode deposited by bismuth vanadate BV20 particles.

The electrochemical impedance spectroscopy (EIS) was performed to acquire Nyquist plots to further investigate the charge transfer performance of the photoanodes under illumination (FIG. 5D). The Nyquist plots arc diameter could be qualitatively related to the interfacial charge transfer kinetics [T. Bertok, L. Lorencova, E. Chocholova, E. Jane, A. Vikartovska, P. Kasak, J. Tkac, Electrochemical Impedance Spectroscopy Based Biosensors: Mechanistic Principles, Analytical Examples and Challenges towards Commercialization for Assays of Protein Cancer Biomarkers, ChemElectroChem. 6 (2019) 989-1003, incorporated herein by reference in its entirety]. FIG. 5D demonstrates the EIS spectra of BV10, BV20 and B30. The semicircle diameter of BV20 had the lowest value among the three, confirming the proper interfacial optical band positioned within water splitting potentials, suppression of charge recombination, and facile charge flow in the photoanodes. On the other hand, BV10 demonstrated a large semicircular diameter, which suggested that the charge flow was reduced in this case due to unwanted barriers. The kinetics order of charge transfer can be given as BV20>BV30>>BV10.

The % incident photon-to-current conversion efficiency (IPCE) of the BV photoanodes was recorded at various wavelengths under calibrated conditions at 1.23 V vs RHE bias potential. As demonstrated in FIG. 5E, the % IPCE values of all BV films dropped swiftly by going from ultraviolet to visible range. The % IPCE is almost negligible at 510 nm for all BV photoanodes. The maximum % IPCE value was acquired for BV20, which reached at ~22% at 310 nm. For BV10 and BV30 photoanodes, the values reached to ~14% and ~2.5%, respectively. These results further demonstrated that morphological and crystalline features of the BV material are critical for photoexcitons generation and suppression of charge recombination.

Figure 10:
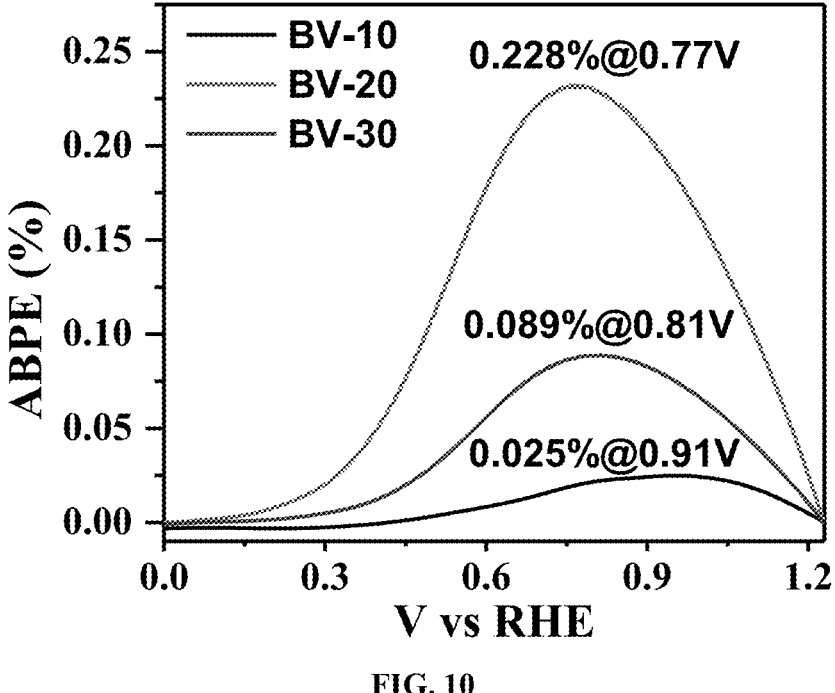
FIG. 10 is an overlay of photoinduced assessments of BV10, BV20, and BV30 photoanodes via applied bias photon-to-current efficiency (ABPE) calculation.

As discussed above, BV20 exhibited exceptional monocrystalline morphology with the dominant [222] facet. The widely exposed facet and uniform morphology facilitate the maximum utilization of the absorbed photons into photoexcitons generation as well as their proper flow. The lowest % IPCE value of BV10 indicates that the charge flow can be heavily affected by the non-uniform crystallinity and morphology, which leads to low photocurrent generation and rapid photocorrosion (FIGS. 5A-B). Further photoinduced assessment of BV10, BV20, and BV30 photoanodes was carried out via applied bias photon-to-current efficiency (ABPE) calculations using Equation 3, and the results are given in FIG. 10 [T. W. Kim, K.-S. Choi, Nanoporous $BiVO_4$ Photoanodes with Dual-Layer Oxygen Evolution Catalysts for Solar Water Splitting, Science (80). 343 (2014) 990-994, incorporated herein by reference in its entirety].

$$ABPE = I\frac{1.23V - V_{bias}}{P(1SUN)} \qquad (3)$$

"I" is photocurrent response in terms of $mAcm^{-2}$, "$V_{bias}$" is the applied potential, and "P" is the power of one sunlight equal to $100\ mVcm^{-2}$.

The applied bias photon-to-current efficiency (ABPE) of the photoanodes calculated using their I-V curve by assuming 100% Faradaic Efficiency (FE) [T. W. Kim, K.-S. Choi, Nanoporous $BiVO_4$ Photoanodes with Dual-Layer Oxygen Evolution Catalysts for Solar Water Splitting, Science (80). 343 (2014) 990-994, incorporated herein by reference in its entirety], is provided in FIG. 10. The % ABPE results suggest that BV20 has the maximum photoconversion efficiency of 0.228% at a relatively low bias potential, i.e., 0.77V vs RHE. The % ABPE of BV20 is almost 10 times and 2.5 times of BV10 and BV30 photoanodes, respectively. On the other hand, the BV10 and BV30 photoanodes showed lower photoconversions even at higher bias potentials. The large value of % ABPE of BV20 photoanodes is impressive because it was obtained using bare BV20 material as a single photon absorber at a potential as low as 0.77 V versus RHE, which are highly favorable features for assembling a tandem cell or a photoelectrochemical diode [F. F. Abdi, L. Han, A. H. M. Smets, M. Zeman, B. Dam, R. Van De Krol, Efficient solar water splitting by enhanced charge separation in a bismuth vanadate-silicon tandem photoelectrode, Nat. Commun. 4 (2013); and L. Tong, A. Iwase, A. Nattestad, U. Bach, M. Weidelener, G. Götz, A. Mishra, P. Bauerle, R. Amal, G. G. Wallace, A. J. Mozer, Sustained solar hydrogen generation using a dye-sensitised NiO photocathode/$BiVO_4$ tandem photo-electrochemical device, Energy Environ. Sci. 5 (2012) 9472-9475, each incorporated herein by reference in their entirety]. The comparative results further indicate that the enhanced photoinduced charge generation, separation and transportation with uphill PEC water splitting properties of the octahedral BV20 samples having highly controlled morphology.

Analysis of above results suggests that surface photo kinetics are greatly controlled by the photoanode material's morphology, and proper design of material could enhance the photocurrent generation, photoconversion efficiency, and photostability of the materials.

Example 9

In summary, monodispersed, highly crystalline $BiVO_4$ microcrystals having octahedral morphology were synthesized via controlled ultrasonication method. Large-scale synthesis of highly controlled and photoactive octahedral shaped BV photocatalysts via highly standardized ultrasonic-assisted hydrothermal approach was described. Excellent morphology was acquired within about 30 minutes of sonication by tuning the amplitude of the ultrasonic waves while keeping other parameters constant. The morphologies were compared with the $BiVO_4$ particles prepared by conventional hydrothermal process. Ultrasonication was found to be an effective method to develop BV with highly controlled morphology in exceptional yield. Additionally, the PEC performance of the BV synthesized herein was found to be improved as compared to those reported previously. The pre- and post-ultrasonication effect on the morphology of the $BiVO_4$ was determined by tuning the ultrasonic amplitude. Desirable morphology of BV was acquired using the ultrasonic amplitude of about 20% (i.e., BV20).

The XRD analysis demonstrates a tetragonal crystal phase of BV20. The photoelectrochemical (PEC) performance of the materials was found to be dependent on the morphology of the BV photoanode material. A photostability of >2 hours with a photocurrent density of 0.9 mAcm$^{-2}$ were observed for BV20 photoanode. The % ABPE results suggest that BV20 gets a maximum photoconversion efficiency of 0.228% at a relatively low bias potential, i.e., 0.77V vs RHE, The % IPCE is almost negligible at 510 nm for all photoanodes. A maximum % IPCE value reached at ~22% at 310 nm for BV20 photoanode. The long-term photostability, % ABPE, and % IPCE results obtained from BV20 photoanodes suggest that the BV20 material has more photoactive sites due to its highly uniform crystalline morphology. This distinct morphology of BV20 photoanode, which provides sufficient spaces for photoexcitons transport and suppresses charge recombination, facilitates the dominant photo oxidation of water at a relatively low over potential.

The invention claimed is:

1. A method of preparing bismuth vanadate particles, the method comprising:

mixing a bismuth (III) salt and an acidic aqueous solution to form a bismuth mixture;

mixing a metavanadate salt and a basic aqueous solution to form a vanadate mixture;

mixing the vanadate mixture and the bismuth mixture to form a reaction mixture that is simultaneously subjected to ultrasonication; and hydrothermally treating the reaction mixture thereby forming the bismuth vanadate particles, wherein:

the bismuth vanadate particles have an octahedral shape; and the bismuth vanadate particles comprise crystalline $BiVO_4$ having a tetragonal crystal symmetry.

2. The method of claim 1, wherein the bismuth vanadate particles have an average particle size in a range of 0.8-6 μm.

3. The method of claim 1, wherein the reaction mixture is subjected to ultrasonication at a frequency in a range of 17.5-22.5 kHz.

4. The method of claim 1, wherein the reaction mixture is subjected to ultrasonication at an amplitude in a range of from 18 to 48 microns for an ultrasonicator equipped with a horn of 0.5 inch diameter.

5. The method of claim 4, wherein the reaction mixture is subjected to ultrasonication at an amplitude in a range of from 28 to 35 microns for an ultrasonicator equipped with a horn of 0.5 inch diameter, and wherein the bismuth vanadate particles consist essentially of crystalline $BiVO_4$ having a tetragonal crystal symmetry.

6. The method of claim 1, wherein the reaction mixture is hydrothermally treated at a temperature of 100-250° C.

7. The method of claim 1, wherein the bismuth (III) salt is bismuth (III) nitrate.

8. The method of claim 1, wherein the metavanadate salt is ammonium metavanadate.

9. The method of claim 1, wherein the acidic aqueous solution comprises nitric acid, and the basic aqueous solution comprises sodium hydroxide.

10. The method of claim 1, wherein the bismuth mixture further comprises an ionic surfactant.

11. The method of claim 10, wherein the ionic surfactant is sodium dodecylbenzene sulfonate.

* * * * *